United States Patent
Alkan

(10) Patent No.: US 10,750,120 B2
(45) Date of Patent: *Aug. 18, 2020

(54) METHOD AND APPARATUS FOR REDUCING ISOLATION IN A HOME NETWORK

(71) Applicant: PPC Broadband, Inc., East Syracuse, NY (US)

(72) Inventor: Erdogan Alkan, Manlius, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/007,810

(22) Filed: Jun. 13, 2018

(65) Prior Publication Data
US 2018/0295321 A1     Oct. 11, 2018

Related U.S. Application Data

(63) Continuation of application No. 13/333,060, filed on Dec. 21, 2011, now Pat. No. 10,021,343.
(Continued)

(51) Int. Cl.
*H04N 7/10* (2006.01)
*H04N 21/436* (2011.01)

(52) U.S. Cl.
CPC ........... *H04N 7/104* (2013.01); *H04N 21/436* (2013.01)

(58) Field of Classification Search
None
See application file for complete search history.

(56) References Cited

U.S. PATENT DOCUMENTS 2,662,217 A    12/1953  Roberts
3,790,909 A     2/1974  LeFevre
(Continued)

FOREIGN PATENT DOCUMENTS

JP     55-80989 A      6/1980
JP     55-132126 A    10/1980
(Continued)

OTHER PUBLICATIONS

Wells et al., Cable Television Entry Adapter, U.S. Appl. No. 13/245,510, filed Sep. 26, 2011.
(Continued)

*Primary Examiner* — Jason K Lin
(74) *Attorney, Agent, or Firm* — MH2 Technology Law Group LLP

(57) ABSTRACT

This invention disclosure relates to a community access television (CATV) signal distribution system which improves signal isolation issues for systems which are distributing both CATV signals and in-home entertainment (IHE) signals. The signal distribution system includes a signal input port, a first multi-port signal splitter and a second multi-port signal splitter. The first multi-port signal splitter is coupled to the signal input port through a first diplexer, and the second multi-port signal splitter is coupled to the signal input port through a second diplexer. In some embodiments the first diplexer high-pass node and the second diplexer high-pass node are coupled together. In some embodiment the signal distribution system includes a signal output port coupled to the signal input port through a third diplexer. The high-pass node of the third diplexer is coupled to the high-pass node of the first diplexer.

25 Claims, 8 Drawing Sheets

Related U.S. Application Data

(60) Provisional application No. 61/425,680, filed on Dec. 21, 2010, provisional application No. 61/427,351, filed on Dec. 27, 2010, provisional application No. 61/552,458, filed on Oct. 28, 2011.

(56) References Cited

U.S. PATENT DOCUMENTS

| | | |
|---|---|---|
| 3,939,431 A | 2/1976 | Cohlman |
| 4,027,219 A | 5/1977 | Van Alphen et al. |
| 4,306,403 A | 12/1981 | Hubbard et al. |
| 4,344,499 A | 8/1982 | Van der Lely et al. |
| 4,418,424 A | 11/1983 | Kawamoto et al. |
| 4,512,033 A | 4/1985 | Schrock |
| 4,520,508 A | 5/1985 | Reichert, Jr. |
| 4,521,920 A | 6/1985 | Forsberg et al. |
| 4,648,123 A | 3/1987 | Schrock |
| 4,677,390 A | 6/1987 | Wagner |
| 4,715,012 A | 12/1987 | Mueller, Jr. |
| 4,961,218 A | 10/1990 | Kiko |
| 4,982,440 A | 1/1991 | Dufresne et al. |
| 5,010,399 A | 4/1991 | Goodman et al. |
| 5,126,686 A | 6/1992 | Tam |
| 5,126,840 A | 6/1992 | Dufresne et al. |
| 5,214,505 A | 5/1993 | Rabowsky et al. |
| 5,231,660 A | 7/1993 | West, Jr. |
| 5,235,612 A | 8/1993 | Stilwell et al. |
| 5,245,300 A | 9/1993 | Sasaki |
| 5,247,310 A * | 9/1993 | Waters .............. H01Q 3/22 342/368 |
| 5,319,709 A * | 6/1994 | Raiser .............. H04N 7/1713 348/E7.067 |
| 5,345,504 A | 9/1994 | West, Jr. |
| 5,361,394 A | 11/1994 | Shigihara |
| 5,369,642 A | 11/1994 | Shioka et al. |
| 5,389,882 A | 2/1995 | I'Anson et al. |
| 5,485,630 A | 1/1996 | Lee et al. |
| 5,548,255 A | 8/1996 | Spielman |
| 5,557,319 A | 9/1996 | Gurusami et al. |
| 5,557,510 A | 9/1996 | McIntyre et al. |
| 5,719,792 A | 2/1998 | Bush |
| 5,729,824 A * | 3/1998 | O'Neill .............. H04L 12/2801 333/110 |
| 5,740,044 A | 4/1998 | Ehrenhardt et al. |
| 5,745,836 A | 4/1998 | Williams |
| 5,745,838 A | 4/1998 | Tresness et al. |
| 5,815,794 A | 9/1998 | Williams |
| 5,818,825 A | 10/1998 | Corrigan et al. |
| 5,839,052 A | 11/1998 | Dean et al. |
| 5,845,190 A * | 12/1998 | Bushue .............. H04B 3/00 725/130 |
| 5,893,024 A | 4/1999 | Sanders et al. |
| 5,937,330 A | 8/1999 | Vince et al. |
| 5,950,111 A | 9/1999 | Georger et al. |
| 5,956,075 A | 9/1999 | Matsuo |
| 5,970,053 A | 10/1999 | Schick et al. |
| 6,012,271 A | 1/2000 | Wilkens et al. |
| 6,014,547 A | 1/2000 | Caporizzo et al. |
| 6,049,693 A | 4/2000 | Baran et al. |
| 6,069,960 A | 5/2000 | Mizukami et al. |
| 6,094,211 A | 7/2000 | Baran et al. |
| 6,101,932 A | 8/2000 | Wilkens |
| 6,128,040 A | 10/2000 | Shinbori et al. |
| 6,129,187 A | 10/2000 | Bellanger et al. |
| 6,160,990 A | 12/2000 | Kobayashi et al. |
| 6,173,225 B1 | 1/2001 | Stelzle et al. |
| 6,185,432 B1 | 2/2001 | Vembu |
| 6,205,138 B1 | 3/2001 | Nihal et al. |
| 6,229,375 B1 | 5/2001 | Koen |
| 6,253,077 B1 | 6/2001 | Burt et al. |
| 6,348,837 B1 | 2/2002 | Ibelings |
| 6,348,955 B1 | 2/2002 | Tait |
| 6,373,349 B2 | 4/2002 | Gilbert |
| 6,377,316 B1 | 4/2002 | Mycynek et al. |
| 6,388,539 B1 | 5/2002 | Rice |
| 6,425,132 B1 | 7/2002 | Chappell |
| 6,430,904 B1 | 8/2002 | Coers et al. |
| 6,486,907 B1 | 11/2002 | Farber et al. |
| 6,495,998 B1 | 12/2002 | Terreault |
| 6,498,925 B1 | 12/2002 | Tauchi |
| 6,510,152 B1 | 1/2003 | Gerszberg et al. |
| 6,546,705 B2 | 4/2003 | Scarlett et al. |
| 6,550,063 B1 | 4/2003 | Matsuura |
| 6,560,778 B1 | 5/2003 | Hasegawa |
| 6,570,914 B1 | 5/2003 | Ichihara |
| 6,570,928 B1 | 5/2003 | Shibata |
| 6,587,012 B1 | 7/2003 | Farmer et al. |
| 6,622,304 B1 | 9/2003 | Carhart |
| 6,640,338 B1 | 10/2003 | Shibata |
| 6,678,893 B1 | 1/2004 | Jung |
| 6,683,513 B2 | 1/2004 | Shamsaifar et al. |
| 6,725,462 B1 | 4/2004 | Kaplan |
| 6,725,463 B1 | 4/2004 | Birleson |
| 6,728,968 B1 | 4/2004 | Abe et al. |
| 6,737,935 B1 | 5/2004 | Shafer |
| 6,757,910 B1 | 6/2004 | Bianu |
| 6,758,292 B2 | 7/2004 | Shoemaker |
| 6,804,828 B1 | 10/2004 | Shibata |
| 6,843,044 B2 | 1/2005 | Clauss |
| 6,845,232 B2 | 1/2005 | Darabi |
| 6,920,614 B1 | 1/2005 | Schindler et al. |
| 6,868,552 B1 | 3/2005 | Masuda et al. |
| 6,877,166 B1 | 4/2005 | Roeck et al. |
| 6,880,170 B1 | 4/2005 | Kauffman et al. |
| 6,915,530 B1 | 7/2005 | Kauffman et al. |
| 6,928,175 B1 | 8/2005 | Bader et al. |
| 6,942,595 B2 | 9/2005 | Hrazdera |
| 7,003,275 B1 | 2/2006 | Petrovic |
| 7,029,293 B2 | 4/2006 | Shapson et al. |
| 7,039,432 B2 | 5/2006 | Strater et al. |
| 7,048,106 B2 | 5/2006 | Hou |
| 7,127,734 B1 | 10/2006 | Amit |
| 7,162,731 B2 | 1/2007 | Reidhead et al. |
| 7,167,693 B2 | 1/2007 | Bachman et al. |
| 7,254,827 B1 | 8/2007 | Terreault |
| 7,283,479 B2 | 10/2007 | Ljungdahl et al. |
| 7,399,255 B1 | 7/2008 | Johnson et al. |
| 7,404,355 B2 | 7/2008 | Viaud et al. |
| 7,416,068 B2 | 8/2008 | Ray et al. |
| 7,454,252 B2 | 11/2008 | El-Sayed |
| 7,464,526 B2 | 12/2008 | Coenen |
| 7,505,819 B2 | 3/2009 | El-Sayed |
| 7,508,284 B2 | 3/2009 | Shafer |
| 7,530,091 B2 | 5/2009 | Vaughan |
| 7,592,883 B2 | 9/2009 | Shafer |
| 7,603,693 B2 | 10/2009 | Masuda et al. |
| 7,675,381 B2 | 6/2010 | Lin |
| 7,742,777 B2 | 6/2010 | Strater et al. |
| 7,748,023 B2 | 6/2010 | Weinstein et al. |
| 7,908,625 B2 | 3/2011 | Robertson et al. |
| 8,001,579 B2 | 8/2011 | Olson et al. |
| 8,213,457 B2 | 7/2012 | Kelma et al. |
| 8,286,209 B2 | 10/2012 | Egan et al. |
| 8,695,055 B2 | 4/2014 | Labro |
| 2001/0016950 A1 | 8/2001 | Matsuura |
| 2002/0052179 A1* | 5/2002 | Hwang .............. H03H 7/0115 455/11.1 |
| 2002/0141347 A1 | 10/2002 | Harp et al. |
| 2002/0141494 A1 | 10/2002 | Chappell |
| 2002/0144292 A1 | 10/2002 | Uemura et al. |
| 2002/0166124 A1 | 11/2002 | Gurantz et al. |
| 2002/0174423 A1 | 11/2002 | Fifield et al. |
| 2002/0174435 A1 | 11/2002 | Weinstein et al. |
| 2002/0190811 A1* | 12/2002 | Sperber .............. H04B 3/143 333/28 R |
| 2003/0084458 A1 | 5/2003 | Ljungdahl et al. |
| 2004/0068753 A1* | 4/2004 | Robertson .............. H04N 7/104 725/126 |
| 2004/0076192 A1 | 4/2004 | Zerbe et al. |
| 2004/0107445 A1* | 6/2004 | Amit .............. H04L 12/2801 725/127 |
| 2004/0113742 A1 | 6/2004 | Tanaka |
| 2004/0147273 A1 | 7/2004 | Morphy |
| 2004/0172659 A1 | 9/2004 | Ljungdahl et al. |

(56) References Cited

U.S. PATENT DOCUMENTS

| | | |
|---|---|---|
| 2004/0229561 A1 | 11/2004 | Cowley et al. |
| 2005/0034167 A1* | 2/2005 | Weinstein .............. H04N 7/104 725/129 |
| 2005/0034168 A1 | 2/2005 | Beveridge |
| 2005/0044573 A1* | 2/2005 | Preschutti .............. H04N 7/104 725/78 |
| 2005/0047051 A1 | 3/2005 | Marland |
| 2005/0144649 A1 | 6/2005 | Bertonis |
| 2005/0155082 A1 | 7/2005 | Weinstein et al. |
| 2005/0183130 A1 | 8/2005 | Sadja et al. |
| 2005/0190101 A1* | 9/2005 | Hiramatsu ................ H01P 1/38 342/175 |
| 2005/0210529 A1* | 9/2005 | Pavlic ..................... H03H 7/46 725/127 |
| 2005/0210977 A1 | 9/2005 | Yan |
| 2005/0283815 A1 | 12/2005 | Brooks et al. |
| 2005/0289632 A1 | 12/2005 | Brooks et al. |
| 2006/0015921 A1 | 1/2006 | Vaughan |
| 2006/0041918 A9 | 2/2006 | Currivan et al. |
| 2006/0148406 A1 | 7/2006 | Strater et al. |
| 2006/0191359 A1 | 8/2006 | Tarasinski et al. |
| 2006/0205442 A1 | 9/2006 | Phillips et al. |
| 2006/0241838 A1 | 10/2006 | Mongiardo et al. |
| 2006/0282871 A1 | 12/2006 | Yo |
| 2007/0024393 A1 | 2/2007 | Forse et al. |
| 2007/0217436 A1 | 9/2007 | Markley |
| 2007/0288981 A1 | 12/2007 | Mitsuse et al. |
| 2007/0288982 A1 | 12/2007 | Donahue |
| 2008/0001645 A1 | 1/2008 | Kuroki |
| 2008/0022344 A1 | 1/2008 | Riggsby |
| 2008/0040764 A1 | 2/2008 | Weinstein et al. |
| 2008/0075012 A1 | 3/2008 | Zielinski et al. |
| 2008/0120667 A1 | 5/2008 | Zaltsman |
| 2008/0127287 A1 | 5/2008 | Alkan et al. |
| 2008/0157898 A1 | 7/2008 | Palinkas et al. |
| 2008/0247401 A1 | 10/2008 | Bhal et al. |
| 2008/0247541 A1 | 10/2008 | Cholas et al. |
| 2008/0271094 A1 | 10/2008 | Kliger et al. |
| 2008/0313691 A1 | 12/2008 | Cholas et al. |
| 2009/0031391 A1 | 1/2009 | Urbanek |
| 2009/0047917 A1 | 2/2009 | Phillips et al. |
| 2009/0077608 A1 | 3/2009 | Romerein et al. |
| 2009/0113511 A1 | 4/2009 | Lee |
| 2009/0153263 A1 | 6/2009 | Lin |
| 2009/0154369 A1 | 6/2009 | Helvig et al. |
| 2009/0165070 A1 | 6/2009 | McMullin et al. |
| 2009/0180782 A1 | 7/2009 | Bernard et al. |
| 2009/0217325 A1 | 8/2009 | Kliger et al. |
| 2009/0316608 A1 | 12/2009 | Singh et al. |
| 2009/0320085 A1 | 12/2009 | Wang |
| 2009/0320086 A1 | 12/2009 | Rijssemus et al. |
| 2010/0017842 A1 | 1/2010 | Wells |
| 2010/0095344 A1 | 4/2010 | Newby et al. |
| 2010/0100912 A1 | 4/2010 | Olson et al. |
| 2010/0100918 A1 | 4/2010 | Egan, Jr. et al. |
| 2010/0100921 A1 | 4/2010 | Olson et al. |
| 2010/0125877 A1 | 5/2010 | Wells et al. |
| 2010/0146564 A1 | 6/2010 | Halik et al. |
| 2010/0194489 A1 | 8/2010 | Kearns et al. |
| 2010/0225813 A1 | 9/2010 | Hirono et al. |
| 2010/0266000 A1 | 10/2010 | Froimovich et al. |
| 2011/0010749 A1 | 1/2011 | Alkan |
| 2011/0051014 A1 | 3/2011 | Wang et al. |
| 2011/0069740 A1 | 3/2011 | Cowley et al. |
| 2011/0072472 A1 | 3/2011 | Wells et al. |
| 2011/0085452 A1 | 4/2011 | Kelma et al. |
| 2011/0085480 A1 | 4/2011 | Kelma et al. |
| 2011/0085586 A1 | 4/2011 | Kelma et al. |
| 2011/0088077 A1 | 4/2011 | Kelma et al. |
| 2012/0054805 A1 | 3/2012 | Shafer et al. |
| 2012/0054819 A1 | 3/2012 | Alkan et al. |
| 2012/0081190 A1 | 4/2012 | Rijssemus |
| 2012/0151548 A1 | 6/2012 | Rakib |

FOREIGN PATENT DOCUMENTS

| | | |
|---|---|---|
| JP | 58-99913 | 12/1981 |
| JP | 57-091055 A | 6/1982 |
| JP | 58-101582 A | 6/1983 |
| JP | 59026709 | 8/1984 |
| JP | 61-157035 A | 7/1986 |
| JP | 05-191416 A | 7/1993 |
| JP | 07-038580 A | 2/1995 |
| JP | 11-069334 A | 3/1999 |
| JP | 2001-177580 A | 6/2001 |
| JP | 2004-080483 | 3/2004 |
| JP | 2005-005875 | 1/2005 |
| JP | 2007-166109 A | 6/2007 |
| JP | 2007-166110 A | 6/2007 |
| WO | 0024124 A1 | 4/2000 |
| WO | 0172005 A1 | 9/2001 |
| WO | 0233969 A1 | 4/2002 |
| WO | 02091676 A1 | 11/2002 |

OTHER PUBLICATIONS

Author Unknown, International Search Report dated May 31, 2011, PCT Application No. PCT/US2010/049568.

Egan, Multi-Port Entry Adapter, Hub and Method for Interfacing a CATV Network and a MoCA Network, U.S. Appl. No. 12/255,008, filed Oct. 21, 2008.

Wells, CATV Entry Adapter and Method for Preventing Interference with eMTA Equipment from MoCA Signals, U.S. Appl. No. 12/691,149, filed Jan. 21, 2010.

Halik, CATV Entry Adapter and Method Utilizing Directional Couplers for MoCA Signal Communication, U.S. Appl. No. 12/704,833, filed Feb. 12, 2010.

Newby, Ingress Noise Inhibiting Network Interface Device and Method for Cable Television Networks, U.S. Appl. No. 12/250,229, filed Oct. 13, 2008.

Author Unknown, Office Action Summary dated Nov. 11, 2011, U.S. Appl. No. 12/255,008, filed Oct. 21, 2008.

Author Unknown, Office Action Summary dated Jan. 23, 2012, U.S. Appl. No. 12/250,229, filed Oct. 13, 2008.

Wells, Passive Multi-Port Entry Adapter and Method for Preserving Downstream CATV Signal Strength within In-Home Network, U.S. Appl. No. 12/563,719, filed Sep. 21, 2009.

Author Unknwon, Office Action Summary dated Mar. 6, 2012, U.S. Appl. No. 12/563,719, filed Sep. 21, 2009.

Wells, Passive-Active Terminal Adapter and Method Having Automatic Return Loss Control, U.S. Appl. No. 12/175,366, filed Jul. 17, 2008.

Alkan, Home Network Frequency Conditioning Device and Method, U.S. Appl. No. 13/180,100, filed Jul. 11, 2011.

Shafer, Home Network Frequency Conditioning Device, U.S. Appl. No. 13/178,149, filed Jul. 7, 2011.

Shafer, Low-Pass Filter Circuit, U.S. Appl. No. 13/167,497, filed Jun. 23, 2011.

Wells, Cable Television Entry Adapter, U.S. Appl. No. 13/245,510, filed Sep. 26, 2011.

Alkan, Method and Apparatus for Reducing Isolation in a Home Network, U.S. Appl. No. 13/333,060, filed Dec. 21, 2011.

Shafer, Upstream Bandwidth Conditioning Device, U.S. Appl. No. 12/760,153, filed Apr. 14, 2010.

Non-Final Office Action dated Nov. 27, 2019, U.S. Appl. No. 16/007,810, pp. 1-44.

* cited by examiner

METHOD AND APPARATUS FOR REDUCING ISOLATION IN A HOME NETWORK

CROSS REFERENCE TO RELATED APPLICATIONS

This application is a continuation of and claims priority to U.S. patent application Ser. No. 13/333,060, entitled "Method and Apparatus for Reducing Isolation in a Home Network," filed Dec. 21, 2011, which claims priority to U.S. Provisional Patent Application No. 61/425,680 to Erdogan Alkan entitled "Method and Apparatus for Reducing Isolation in a Home Network," filed Dec. 21, 2010, the disclosure of which is hereby incorporated entirely herein by reference; and this application claims priority to U.S. Provisional Patent Application No. 61/427,351 to Erdogan Alkan entitled "Method and Apparatus for Reducing Isolation in a Home Network," filed. Dec. 27, 2010, the disclosure of which is hereby incorporated entirely herein by reference; and this application claims priority to U.S. Provisional Patent Application No. 61/552,458 to Erdogan Alkan entitled "Method and Apparatus for Reducing Isolation in a Home Network," filed Oct. 28, 2011, the disclosure of which is hereby incorporated entirely herein by reference.

FIELD OF THE INVENTION

This disclosure relates generally to community access or cable television (CATV) networks and to in-home entertainment (IHE) networks. More particularly, the present disclosure relates to a CATV signal distribution system for improving signal isolation problems within an in-home cable infrastructure that distributes both CATV signals and in-home entertainment signals.

BACKGROUND OF THE INVENTION

Community access television, or cable television, (CATV) networks use an infrastructure of interconnected coaxial cables, splitters, amplifiers, filters, trunk lines, cable taps, drop lines and other signal-conducting devices to supply and distribute "downstream" signals from a main signal distribution facility, known as a head-end, toward subscriber premises such as homes and businesses. The downstream signals operate the subscriber equipment, such as television sets, telephones, and computers. The typical CATV network is a two-way communication system. CATV networks also transmit "upstream" signals from the subscriber equipment back to the head-end of the CATV network. For example, upstream bandwidth may include data related to video-on-demand services, such as video requests and billing authorization. Two-way communication is also utilized when using a personal computer connected through the CATV infrastructure to the public Internet, for example when sharing photo albums or entering user account information. In yet another example, Voice over Internet Protocol (VoIP) telephones and security monitoring equipment use the CATV infrastructure and the public Internet as the communication medium for transmitting two-way telephone conversations and monitoring functions.

To permit simultaneous communication of upstream and downstream CATV signals and the interoperability of the subscriber equipment and the equipment associated with the CATV network infrastructure outside of subscriber premises, the downstream and upstream CATV signals are confined to two different frequency bands. In most CATV networks the downstream frequency band, or downstream bandwidth, is within the range of 54-1002 megahertz (MHz) and the upstream frequency band, or upstream bandwidth, is within the range of 5-42 MHz.

An in-home entertainment (IHE) network may be coupled to the CATV network via the same coaxial cable delivering the downstream and upstream bandwidth of the CATV system. The in-home entertainment network can be a network providing multiple streams of high definition video and gaming entertainment. Examples of in-home entertainment network technologies include Ethernet, HomePlug, Home Phoneline Networking Alliance (HPNA), Multimedia over Coax Alliance (MoCA) and 802.11n protocols. The in-home entertainment (IHE) network is coupled to the CATV network within a subscriber premises to allow the CATV network to distribute IHE signals from one multimedia device to another within the subscriber premises.

Since the operation of the subscriber premises IHE network must occur simultaneously with the operation of the CATV services, the IHE signals often utilize a frequency range different from the frequency ranges of the CATV upstream and downstream signals. A typical IHE frequency band is 1125-1675 MHz, which is referred to in this document as the multimedia-over-coax frequency range, or bandwidth. In this document multimedia-over-coax signals are IHE signals within this frequency range. A specific IHE network technology can includes other frequency ranges, but the 1125 to 1675 MHz frequency range is of major relevance because of its principal use in establishing connections between the multimedia devices within a subscriber network.

Although using the in-home cable infrastructure as the communication medium substantially simplifies the implementation of the IHE network, there are certain disadvantages to doing so. One noted problem arises when multimedia-over-coax signals pass backwards through a conventional splitter en route to another IHE-enabled device within the network. The CATV network and the in-home cable infrastructure were originally intended for the distribution of CATV signals. The typical in-home cable infrastructure uses signal splitters to divide CATV downstream signals into multiple CATV downstream paths and to combine multiple CATV upstream signals into a single CATV upstream path. The CATV entry adapter was not originally intended to communicate multimedia-over-coax signals between its ports, as is necessary to achieve multimedia-over-coax signal communication in the IHE network. To implement the IHE network, the multimedia-over-coax signals must traverse between separate signal component legs of a signal splitter/combiner which are connected to the multiple ports.

The typical signal splitter has a high degree of signal rejection or isolation between its separate output signal component legs. When the multimedia-over-coax signals traverse between the separate signal component legs of the splitter, the degree of signal rejection or isolation greatly attenuates the strength of the multimedia-over-coax signals. According to field tests, IHE devices coupled to output ports of a two, three, or four-way signal splitter are able to communicate in the multimedia-over-coax frequency band. However, IHE-compatible devices coupled to the output ports of multi-port splitters such as six-way and eight-way signal splitters are having trouble communicating using multimedia-over-coax signals. For splitters having more than four output ports, the splitters must have special circuitry to overcome communication problems in the multimedia-over-coax band. Thus it is desirable to have a system which transmits both CATV and IHE signals without attenuating or rejecting the IHE signals that are travelling between splitter output ports.

SUMMARY OF THE INVENTION

This disclosure relates generally to community access or cable television (CATV) networks and to in-home entertainment (IHE) networks. More particularly, the present disclosure relates to a CATV signal distribution system for improving signal quality within an in-home cable infrastructure that includes both CATV signals and in-home entertainment signals.

Disclosed is a community access television (CATV) signal distribution system that includes a signal input port, a first multi-port signal splitter, a second multi-port signal splitter, and a signal output port. A first multi-port signal splitter input port of the first multi-port signal splitter is coupled to the signal input port through a first diplexer. A second multi-port signal splitter input port of the second multi-port signal splitter is coupled to the signal input port through a second diplexer. The signal output port is coupled to the signal input port through a third diplexer. In some embodiments the signal input port is coupled to a first diplexer low-pass node of the first diplexer, a second diplexer low-pass node of the second diplexer, and a third diplexer low-pass node of the third diplexer.

In some embodiments the third diplexer includes a third diplexer common node coupled to the signal output port and a third diplexer high-pass node coupled to the first diplexer. In some embodiments the first diplexer comprises a first diplexer common node coupled to the first multi-port signal splitter input port, and a first diplexer high-pass node coupled to the third diplexer high-pass node. In some embodiments the second diplexer includes a second diplexer common node coupled to the second multi-port signal splitter input port, and a second diplexer high-pass node coupled to the first diplexer high-pass node through an attenuator circuit. In some embodiments the attenuator circuit includes an equalizer circuit. In some embodiments the attenuator circuit includes a reflectance circuit.

Disclosed is a community access television (CATV) signal distribution system that includes a signal input port, a first four-way signal splitter, a second four-way signal splitter, and a signal output port. A first four-way signal splitter input port of the first four-way signal splitter is coupled to the signal input port through a first diplexer. A second four-way signal splitter input port of the second four-way signal splitter is coupled to the signal input port through a second diplexer. The signal output port is coupled to the signal input port through a third diplexer. In some embodiments the signal input port is coupled to a first diplexer low-pass node of the first diplexer, a second diplexer low-pass node of the second diplexer, and a third diplexer low-pass node of the third diplexer.

In some embodiments the third diplexer includes a third diplexer common node coupled to the signal output port and a third diplexer high-pass node coupled to the first diplexer. In some embodiments the third diplexer includes a third diplexer common node coupled to the signal output port and a third diplexer high-pass node coupled to the first and the second diplexers. In some embodiments the first diplexer comprises a first diplexer common node coupled to the first four-way signal splitter input port, and a first diplexer high-pass node coupled to the third diplexer high-pass node. In some embodiments the second diplexer includes a second diplexer common node coupled to the second four-way signal splitter input port, and a second diplexer high-pass node coupled to the first diplexer high-pass node through an attenuator circuit. In some embodiments the attenuator circuit includes an equalizer circuit. In some embodiments the attenuator circuit includes a reflectance circuit.

Disclosed is a CATV signal distribution system that includes a signal input port, a first four-way signal splitter, and a second four-way signal splitter. The first four-way signal splitter is coupled to the signal input port through a first diplexer. The second four-way signal splitter is coupled to the signal input port through a second diplexer. In some embodiments a first diplexer high-pass node of the first diplexer and a second diplexer high-pass node of the second diplexer are coupled together. In some embodiments a first diplexer high-pass node of the first diplexer and a second diplexer high-pass node of the second diplexer are coupled together through an attenuator circuit. In some embodiments the attenuator circuit includes an equalizer circuit. In some embodiments the attenuator circuit includes a reflectance circuit. In some embodiments the first diplexer includes a first diplexer common node coupled to a first four-way signal splitter input port, and a first diplexer low-pass node coupled to the signal input port. In some embodiments the second diplexer includes a second diplexer common node coupled to a second four-way splitter input port, and a second diplexer low-pass node coupled to the signal input port.

A method of electrically coupling two multi-port signal splitters is disclosed. The method according to the invention includes the steps of coupling a first multi-port signal splitter to a signal input port through a first diplexer, coupling a second multi-port signal splitter to the signal input port through a second diplexer, and coupling a first diplexer high-pass node of the first diplexer to a second diplexer high-pass node of the second diplexer. In sonic embodiments coupling a first multi-port signal splitter to a signal input port through a first diplexer includes the steps of coupling a first diplexer common node to a first multi-port signal splitter input port, and coupling a first diplexer low-pass node to the signal input port. In some embodiments coupling a second multi-port signal splitter to a signal input port through a second diplexer includes the steps of coupling a second diplexer common node to a second multi-port signal splitter input port, and coupling a second diplexer low-pass node to the signal input port.

In some embodiments the step of coupling a first diplexer high-pass node of the first diplexer to a second diplexer high-pass node of the second diplexer includes coupling the first diplexer high-pass node of the first diplexer to the second diplexer high-pass node of the second diplexer through an attenuator circuit. In some embodiments the attenuator circuit includes an equalizer circuit. In some embodiments the method of electrically coupling two multi-port signal splitters according to the invention includes the step of coupling a signal output port to the signal input port through a third diplexer, where a third diplexer common node is coupled to the signal output port, and where a third diplexer low-pass node is coupled to the signal input port. In some embodiments the method includes the step of coupling a high-pass node of the third diplexer to the high-pass node of the first diplexer. In some embodiments the method includes the step of coupling a high-pass node of the third diplexer to the high-pass nodes of the first and the second diplexers.

A method of electrically coupling two four-way signal splitters is disclosed. The method according to the invention includes the steps of coupling a first four-way signal splitter to a signal input port through a first diplexer, coupling a second four-way signal splitter to the signal input port through a second diplexer, and coupling a first diplexer high-pass node of the first diplexer to a second diplexer high-pass node of the second diplexer. In some embodiments coupling a first four-way signal splitter to a signal input port through a first diplexer includes the steps of coupling a first diplexer common node to a first four-way signal splitter input port, and coupling a first diplexer low-pass node to the signal input port. In some embodiments coupling a second four-way signal splitter to a signal input port through a second diplexer includes the steps of coupling a second diplexer common node to a second four-way signal splitter input port, and coupling a second diplexer low-pass node to the signal input port.

In some embodiments the step of coupling a first diplexer high-pass node of the first diplexer to a second diplexer high-pass node of the second diplexer includes coupling the first diplexer high-pass node of the first diplexer to the second diplexer high-pass node of the second diplexer through an attenuator circuit. In some embodiments the attenuator circuit includes an equalizer circuit. In some embodiments the method of electrically coupling two four-way signal splitters according to the invention includes the step of coupling a signal output port to the signal input port through a third diplexer, where a third diplexer common node is coupled to the signal output port, and where a third diplexer low-pass node is coupled to the signal input port. In some embodiments the method includes the step of coupling a high-pass node of the third diplexer to the high-pass node of the first diplexer. In some embodiments the method includes the step of coupling a high-pass node of the third diplexer to the high-pass nodes of the first and the second diplexers.

The foregoing and other features and advantages of the present invention will be apparent from the following more detailed description of the particular embodiments of the invention, as illustrated in the accompanying drawings.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF EMBODIMENTS OF THE INVENTION

Figure 1:
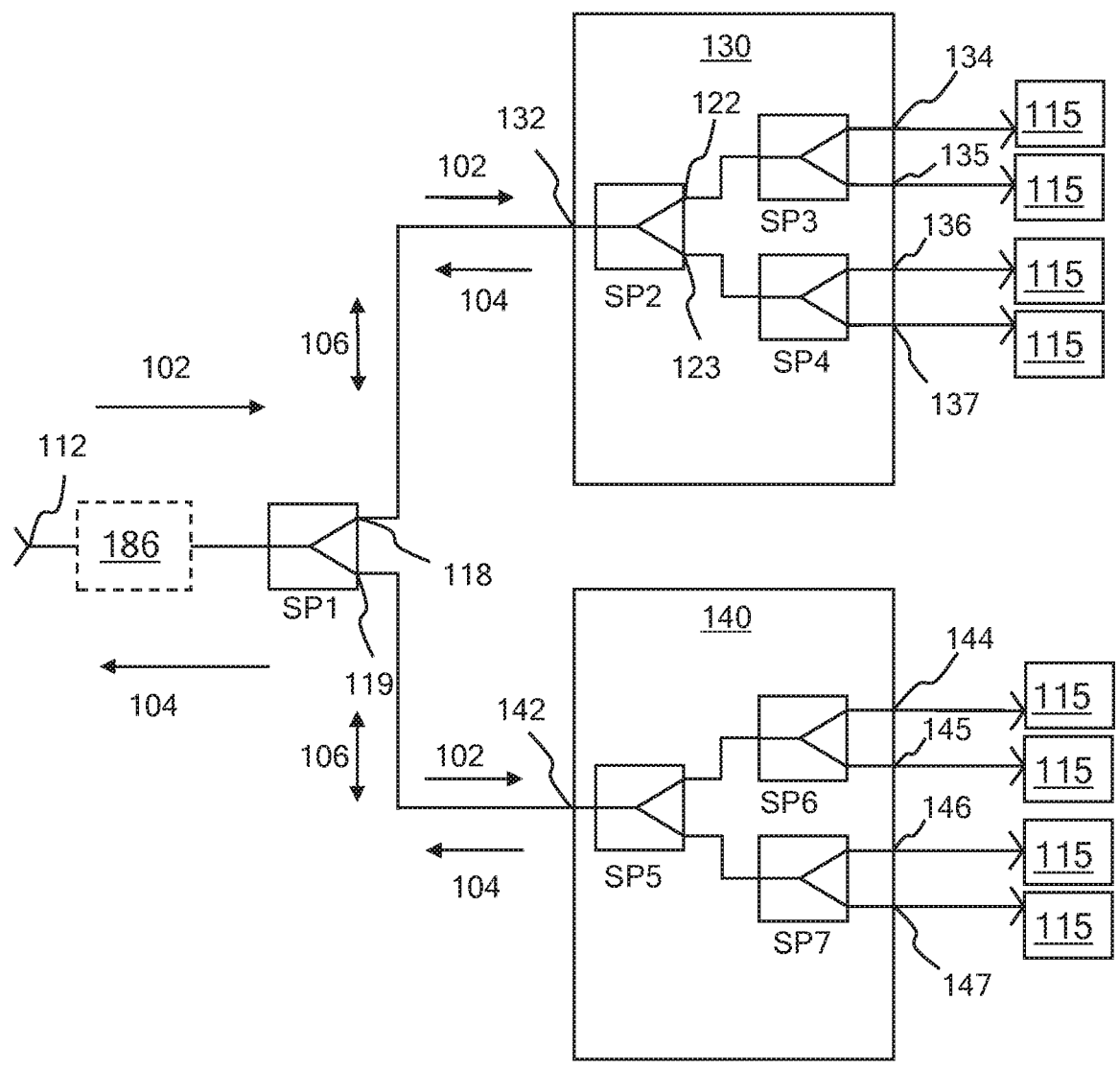
FIG. 1 shows a simplified schematic view of a prior art CATV signal distribution system in which the signal arriving at input port 112 is split eight ways.

Community access television, or cable television, (CATV) networks use an infrastructure of interconnected coaxial cables, splitters, amplifiers, filters, trunk lines, cable taps, drop lines and other signal-conducting devices to supply and distribute "downstream" signals from a main CATV signal distribution facility, known as a head-end, toward subscriber premises such as homes and businesses. The downstream signals operate the subscriber equipment, such as television sets, telephones, and computers. The typical CATV network is a two-way communication system. CATV networks also transmit "upstream" signals from the subscriber equipment back to the head-end of the CATV network. For example, upstream bandwidth may include data related to video-on-demand services, such as video requests and billing authorization. Two-way communication is also utilized when using a personal computer connected through the CATV infrastructure to the public Internet, for example when sharing photo albums or entering user account information. In yet another example, Voice over Internet protocol (VoIP) telephones and security monitoring equipment use the CATV infrastructure and the public Internet as the communication medium for passing two-way telephone conversations and monitoring functions.

To permit simultaneous communication of upstream and downstream CATV signals and the interoperability of the subscriber equipment and the equipment associated with the CATV network infrastructure outside of subscriber premises, the downstream and upstream signals are confined to two different frequency bands. In most CATV networks the downstream frequency band, or downstream bandwidth, is within the range of 54-1002 megahertz (MHz) and the upstream frequency band, or upstream bandwidth, is within the range of 5-42 MHz.

The downstream signals are delivered from the CATV network infrastructure to the subscriber premises at a CATV entry adapter, which is also commonly referred to as an entry device, terminal adapter or a drop amplifier. The entry adapter is a multi-port device which connects at a premises entry port to a CATV drop cable from the CATV network infrastructure. The entry adapter connects at a multiplicity of other distribution ports to coaxial cables which extend throughout the subscriber premises to a cable outlet. Each cable outlet is available to be connected to subscriber equipment. Typically, most homes have coaxial cables extending to cable outlets in almost every room, because different types of subscriber equipment may be used in different rooms. For example, television sets, computers and telephone sets are commonly used in many different rooms of a home or office. The multiple distribution ports of the entry adapter deliver the downstream signals to each cable outlet and conduct the upstream signals from the subscriber equipment through the entry adapter to the drop cable and the CATV infrastructure, In addition to television sets, computers and telephones, a relatively large number of other entertainment and multimedia devices are available for use in homes. For example, a digital video recorder (DVR) is used to record broadcast programming, still photography and moving pictures in a memory medium so that the content can be replayed on a display or television set at a later time selected by the user. As another example, computer games are also played at displays or on television sets. Such computer games may be those obtained over the Internet from the CATV network or from media played on play-back devices connected to displays or television sets. In another example, receivers of satellite-broadcast signals may be distributed for viewing or listening throughout the home. These types of devices, including the more conventional television sets, telephone sets and devices connected to the Internet by the CATV network, are generically referred to as multimedia devices.

An in-home entertainment (IHE) network may be coupled to the CATV network via the same coaxial cable delivering the downstream and upstream bandwidth of the CATV system. The in-home entertainment network can be a network providing multiple streams of high definition video and gaming entertainment. Examples of in-home entertainment network technologies include Ethernet, HomePlug, Home Phoneline Networking Alliance (HPNA), Multimedia over Coax Alliance (MoCA) and 802.11n protocols. The in-home entertainment (IHE) network is coupled to the CATV network within a subscriber premises to allow the CATV network to distribute IHE signals from one multimedia device to another within the subscriber premises.

In a specific example, the in-home entertainment network may employ technology standards developed to distribute multimedia-over-coax signals within the CATV subscriber premises. Products designed to use multimedia-over-coax signals can be used to create an in-home entertainment network by interconnecting presently-known and future multimedia devices, such as set-top boxes, routers and gateways, bridges, optical network terminals, computers, gaming systems, display devices, printers, network-attached storage, and home automation such as furnace settings and lighting control.

An IHE network uses the in-home coaxial cable infrastructure originally established for distribution of CATV signals within the subscriber premises, principally because that coaxial cable infrastructure already exists in most homes and is capable of carrying much more information than is carried in the CATV frequency bands. An IHE network is established by connecting IHE-enabled devices or multimedia-over-coax interface devices at the cable outlets in the rooms of the subscriber premises. Each IHE-enabled device is capable of communicating with every other IHE-enabled device in the in-home or subscriber premises network to deliver the multimedia content throughout the home or subscriber premises as long as IHE signal attenuation does not prohibit communication. The multimedia content that is available from one multimedia device can be displayed, played or otherwise used at a different location within the home, without having to physically relocate the originating multimedia device from one location to another within the subscriber premises. The communication of multimedia content is considered beneficial in more fully utilizing the multimedia devices present in modern homes.

Since the operation of the subscriber premises IHE network must occur simultaneously with the operation of the CATV services, the multimedia-over-coax signals utilize a frequency range different from the frequency ranges of the CATV upstream and downstream signals. A typical multimedia-over-coax frequency band is 1125-1675 MHz. A particular IHE network frequency band may include other frequency ranges, but the 1125-1675 MHz band is of major relevance because of its principal use in establishing connections between the multimedia-over-coax interface devices within the CATV network.

Although using the in-home cable infrastructure as the communication medium substantially simplifies the implementation of the IHE network, there are certain disadvantages to doing so. One noted problem arises when multimedia-over-coax signals pass backwards through a conventional splitter en route to another IHE-enabled device within the network. The CATV network and the in-home cable infrastructure were originally intended for the distribution of CATV signals. The typical in-home cable infrastructure uses signal splitters to divide CATV downstream signals into multiple CATV downstream paths and to combine multiple CATV upstream signals into a single CATV upstream path, as shown in FIG. 1.

FIG. 1 shows a typical configuration for splitting/combining a CATV signal eight ways. In this system two four-way signal splitters 130 and 140, and two-way signal splitter SP1 are used to divide downstream CATV signal 102 eight ways. CATV downstream signals 102 travel from input port 112 to first four-way signal splitter output ports 134, 135, 136, and 137 and second four-way signal splitter output ports 144, 145, 146, and 147 to the pieces of subscriber equipment 115 that may be connected to any or all of output ports 134, 135, 136, 137, 144, 145, 146, or 147. First four-way signal splitter 130 in this example uses two-way splitters SP2, SP3, and SP4 to execute the four-way signal split, and second four-way signal splitter 140 in this example uses two-way splitters SP5, SP6, and SP7 to make the four-way signal split. CATV upstream signals 104 that originate from pieces of subscriber equipment 115 are combined by four-way splitters 130 and 140 and splitter SP1 into a single upstream CATV signal 104 that is sent to the CATV network and head-end. Low-pass filter circuit 186 is a circuit designed to keep IHE signals 106 from exiting the IHE network and entering the CATV network. Low-pass filter circuit 186 is optional and may be used in any of the systems shown or described in this document.

Ideally, the pieces of subscriber equipment 115 that are IHE-compatible should be able to communicate through the splitter legs to the other pieces of IHE-compatible subscriber equipment 115 with multimedia-over-coax signals 106. For example, subscriber equipment 115 at output port 134 is IHE compatible, and can communicate with subscriber equipment 115 at output port 135 by sending multimedia-over-coax signals 106 to output port 135 by jumping the splitter legs of splitter SP3. Subscriber equipment 115 should be able to communicate with subscriber equipment 115 at output port 147 by sending multimedia-over coax-signals 106 which jump several splitter legs to travel from output port 134 to output port 147.

However, the typical signal splitter has a high degree of signal rejection or isolation between its separate output signal component legs. Because conventional signal splitters are designed for the CATV bandwidth signals (e.g., 5-1002 MHz), they have low and non-flat isolation as well as high and non-flat insertion loss in the IHE bands, in particular in the multimedia-over-coax band of 112.5 to 1675 MHz. Additionally, inherent losses in coaxial cables also increase with increasing frequency, resulting in roll-off (e.g., non-flat insertion loss) characteristics in the multimedia-over-coax frequency band. When the multimedia-over-coax signals 106 traverse between the separate signal component legs of a splitter, the degree of signal rejection or isolation greatly attenuates the strength of the multimedia-over-coax signals 106. According to field tests, IHE-enabled devices coupled to the output ports of a single two, three, or four-way signal splitter are able to communicate using the multimedia-over-coax frequency band. However, IHE-enabled devices coupled to the output ports of two different multi-port signal splitters have signal loss problems because of the high isolation and signal path loss of the system for multimedia-over-coax signals 106. Thus IHE-compatible subscriber equipment 115 at port 134, for example, will have signal loss problems when trying to communicate with IHE-compatible subscriber equipment 115 at port 147.

Some IHE network communication protocols recognize the possibility of variable strength multimedia-over-coax signals 106 and provide the capability to boost the strength of multimedia-over-coax signals 106 to compensate for the variable strength of multimedia-over-coax signals 106 that would otherwise be communicated between IHE-enabled devices. However, boosting the strength of multimedia-over-coax signals 106 can result in the strength or power of multimedia-over-coax signals 106 being substantially greater than the strength or power of CATV signals 102 and 104 communicated within the subscriber premises. Consequently, the multimedia-over-coax signals 106 have the capability of adversely affecting the proper functionality of standard CATV subscriber equipment, such as a digital video recorder or an embedded multimedia terminal adapter (eMTA).

Figure 2:
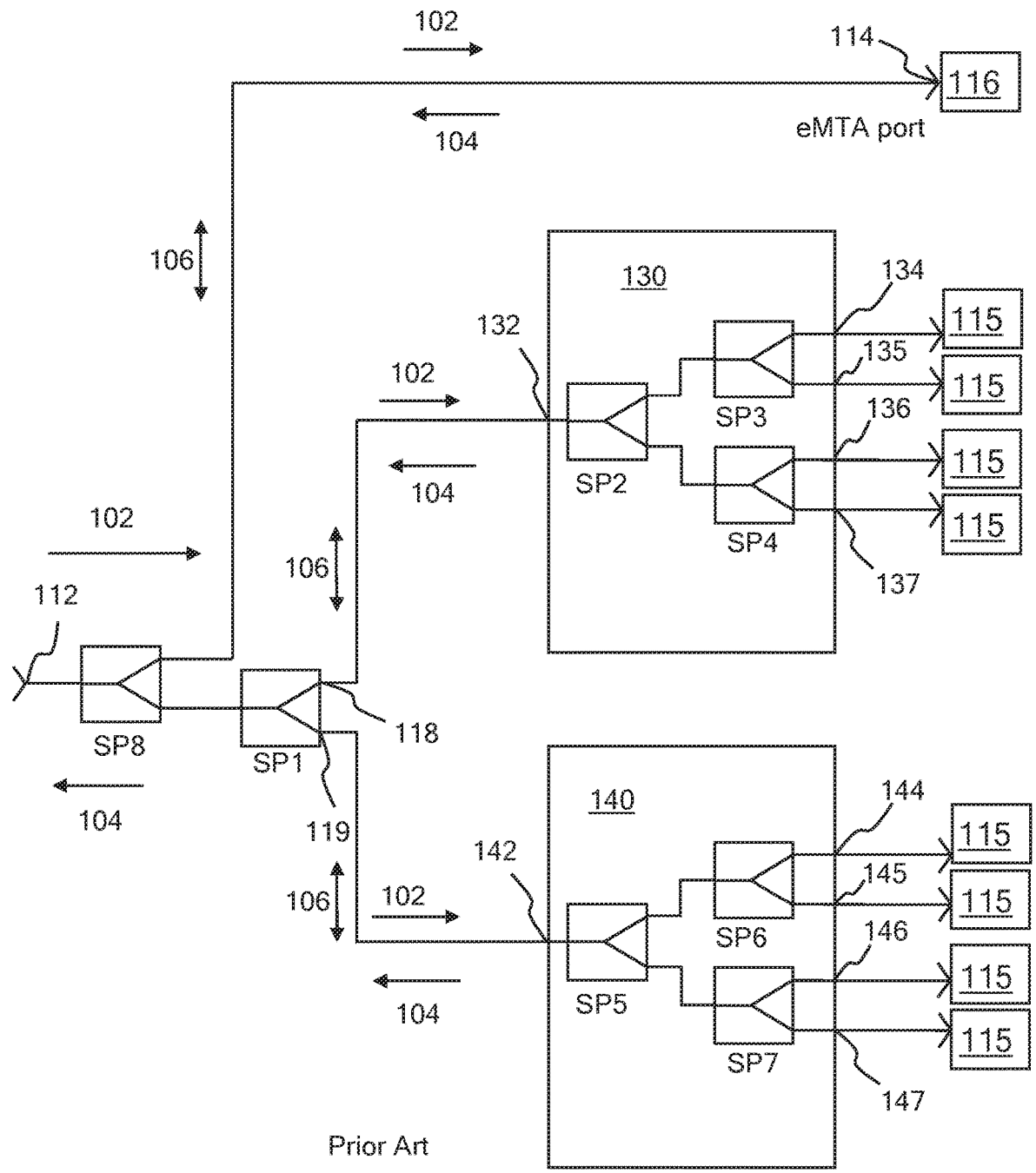
FIG. 2 shows a simplified schematic view of a prior art CATV signal distribution system that includes an output port used to connect to a piece of embedded multimedia terminal adapter (eMTA) subscriber equipment.

FIG. 2 shows a typical example of an IHE network that includes signal output port 114 for embedded multimedia terminal adapter (eMTA) 116. An eMTA device combines a high-speed data cable modem with Voice over Internet Protocol technology to create a platform that connects analog telephones and terminal equipment (e.g., fax) to the cable operator's advanced Internet protocol communications network. The cable modem provides a data interface for communicating Internet protocol packets to and from the CATV network and head-end, and an analog telephone adapter provides a Voice over Internet protocol (VoIP) interface for an analog telephone set. The eMTA device converts between analog voice signals and packets. A lifeline telephone is a well-known example of an eMTA device. The eMTA device is a device which must be assured of communication with the CATV network and head-end even when power is down, because the eMTA device is used for safety and security purposes.

When eMTA devices are used within a multi-split CATV signal distribution system such as that shown in FIG. 1, EMTA device 116 can lose connection with the head-end of the CATV system because of the losses resulting from the multiple signal splits. In the prior art it is strongly recommended to use a first initial signal split for eMTA device 116 so that eMTA device 116 can be guaranteed to not lose connection with the head-end due to low signal strength caused by multiple signal splits. In the prior art signal distribution system of FIG. 2, splitter SP8 is added to separate signal output port 114 from the main signal branch coming from input port 112. The advantage of this system is that output port 114 is assured of good communication with the CATV head-end. Thus output port 114 is used as the eMTA port. The problems is that this approach will not only result in higher isolation between the output ports of four-way splitters 130 and 140, it may prevent communication between the eMTA device 116 coupled to signal output port 114 and the IHE-compatible subscriber devices 115 that are coupled to any of output ports 134, 135, 136, 137, 144, 145, 146, or 147 of the four-way splitters. Therefore, there is a need for a new approach for classic eight-way CATV signal splitters and eMTA-compatible multiport entry devices to solve these issues.

Figure 3:
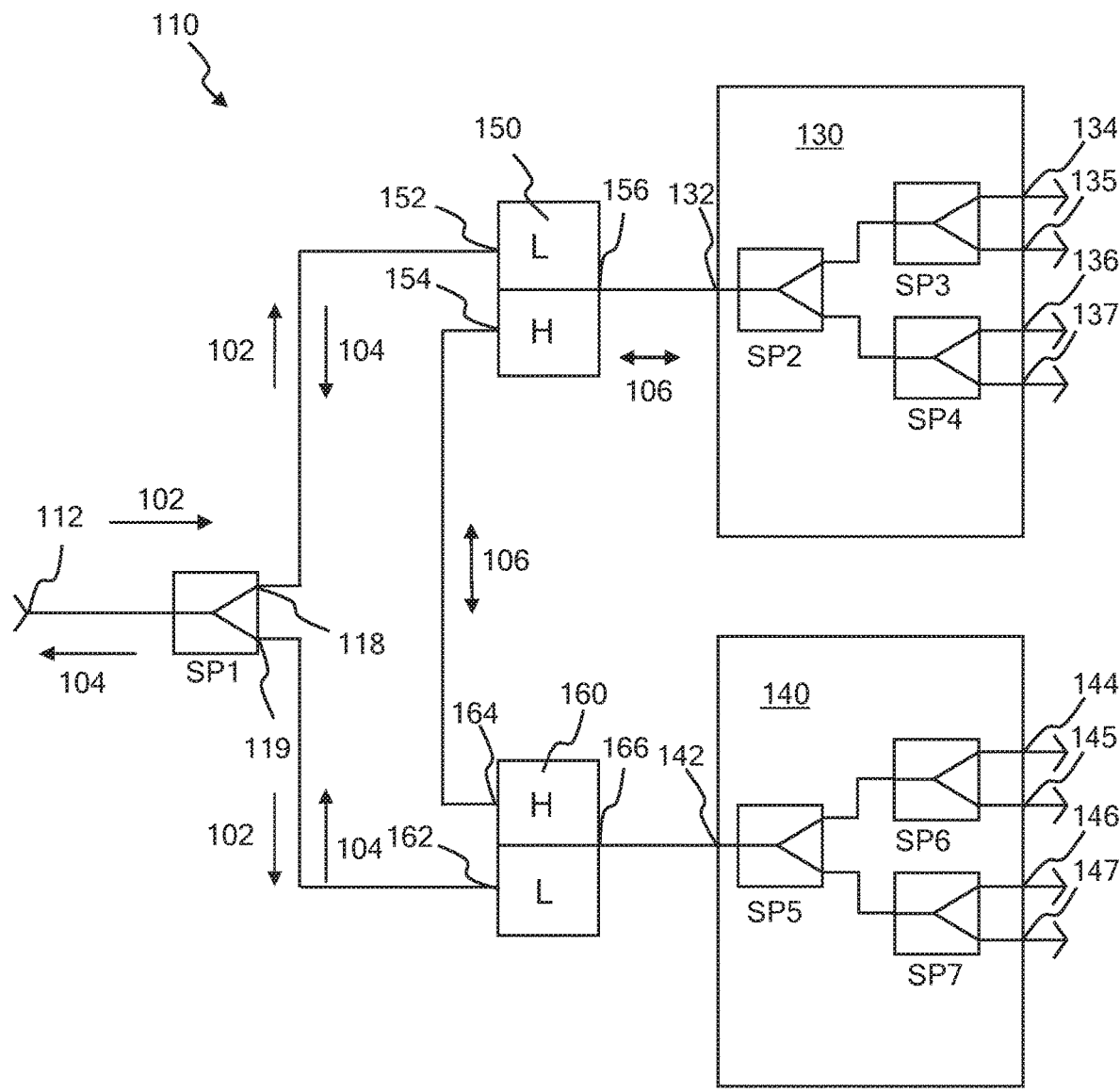
FIG. 3 is a schematic diagram of one embodiment of CATV signal distribution system 110 according to the invention.

FIG. 3 shows a simplified schematic of an embodiment of CATV signal distribution system 110 according to the invention. CATV signal distribution system 110 according to the invention can be included in an entry adapter or other enclosed CATV device. CATV signal distribution system 110 according to the invention can be a distributed device with multiple pieces distributed throughout a home or business network, for example. In some embodiments CATV signal distribution system 110 is contained within a single building. In some embodiments CATV signal distribution system 110 is contained within a single premises network.

CATV signal distribution system 110 of FIG. 3 includes signal input port 112, first multi-port signal splitter 130, and second multi-port signal splitter 140. In some embodiments CATV signal distribution system 110 includes more than two multi-port signal splitters. In the embodiment shown in FIG. 3, multi-port signal splitter 130 is a four-way signal splitter, but the invention is not limited in this aspect. In the embodiment shown in FIG. 3, multi-port signal splitter 140 is a four-way signal splitter, but the invention is not limited in this aspect. In some embodiments CATV signal distribution system 110 according to the invention includes two or more multi-port signal splitters, where each of the multi-port signal splitters has two or more multi-port signal splitter output ports.

CATV signal distribution system 110 of FIG. 3 includes signal input port 112, first four-way signal splitter 130, and second four-way signal splitter 140. In this embodiment first four-way signal splitter 130 includes signal splitters SP2, SP3, and SP4, but other configurations of first four-way signal splitter 130 are envisioned. In this embodiment second four-way signal splitter 140 includes signal splitters SP5, SP6, and SP7, but other configurations of second four-way signal splitter 130 are envisioned.

Two-way splitter SP1 and first and second four-way signal splitters 130 and 140 split downstream CATV signals 102 eight ways such that downstream CATV signals 102 are received by first four-way signal splitter 130 output ports 134, 135, 136, and 137, and second four-way signal splitter 140 output ports 144, 145, 146, and 147.

First four-way signal splitter 130 is coupled to signal input port 112 through first diplexer 150. First diplexer common node 156 is coupled to first four-way signal splitter input port 132. First diplexer low-pass node 152 is coupled to signal input port 112 through first signal splitter SP1. in this way first four-way signal splitter 130 is coupled to signal input port 112 through first diplexer 150.

Second four-way splitter 140 is coupled to signal input port 112 through second diplexer 160. Second diplexer common node 166 is coupled to second four-way signal splitter input port 142. Second diplexer low-pass node 162 is coupled to signal input port 112 through first signal splitter SP1. In this way second four-way signal splitter 40 is coupled to signal input port 112 through second diplexer 160.

A diplexer is a signal splitting device which splits signals according to frequency. In this embodiment multimedia-over-coax signals 106 will be conducted through first diplexer 150 by being conducted back and forth between common node 156 and high-pass node 154, and downstream and upstream CATV signals 102 and 104 will be conducted through first diplexer 150 by being conducted back and forth between common node 156 and low-pass node 152. Similarly, in this embodiment, multimedia-over-coax signals 106 will be conducted through second diplexer 160 by being conducted back and forth between common node 166 and high-pass node 164, and downstream and upstream CATV signals 102 and 104 will be conducted through second diplexer 160 by being conducted back and forth between common node 166 and low-pass node 162. In this way CATV signal distribution system 110 of FIG. 3 separates the multimedia-over-coax signal 106 path from the CATV signal 102 and 104 path.

In the embodiment of CATV signal distribution system 110 shown in FIG. 3, first diplexer 130 high-pass node 154 is coupled to second diplexer high-pass node 164. This allows multimedia-over-coax signals 106 to be conducted from first four-way splitter input port 132 to second four-way splitter input port 142 through diplexers 150 and 160, avoiding two-way splitter SP1. This eliminates the signal isolation loss that would occur in the prior systems shown in FIG. 1 and FIG. 2, where multimedia-over-coax signals 106 being conducted from output port 134 to output port 147 would undergo signal attenuation due to having to jump between the signal output legs of splitter SP1, from node 118 to node 119. It has been found that in 8-way splits the signal losses occurring by having signals traverse between two different four-way splitters is high enough to disrupt communication between the devices at the output ports of the different four-way splitters. In CATV signal distribution system 110 of FIG. 3, however, the signal losses incurred by jumping the splitter legs of SP1 have been eliminated. In this embodiment the signal losses between first four-way signal splitter input port 132 and second four-way signal splitter input port 142 have been eliminated. In this embodiment multimedia-over-coax signals 106 see no more losses in traveling from first four-way signal splitter output port 134 to second four-way signal splitter output port 147 than they see in travelling from output port 134 to output port 137. Subscriber devices 115 coupled to first four-way signal splitter ports 134, 135, 136, and 137 can communicate using multimedia-over-coax signals 106 with subscriber devices 115 coupled to second four-way signal splitter ports 144, 145, 146, and 147 without the signal losses and possible loss of communication that would occur in the situations illustrated in FIG. 1 and FIG. 2.

In some embodiments CATV signal distribution system 110 of FIG. 3 includes active circuit elements, such as one or more amplifier or other active network circuit elements. In some embodiments an active circuit element is placed between first diplexer common node 156 and first four-way splitter input node 132. In some embodiments an active circuit element is placed between second diplexer common node 166 and second four-way splitter input node 142. In some embodiments an active element is placed elsewhere in CATV signal distribution system 110 of FIG. 3.

Figure 4:
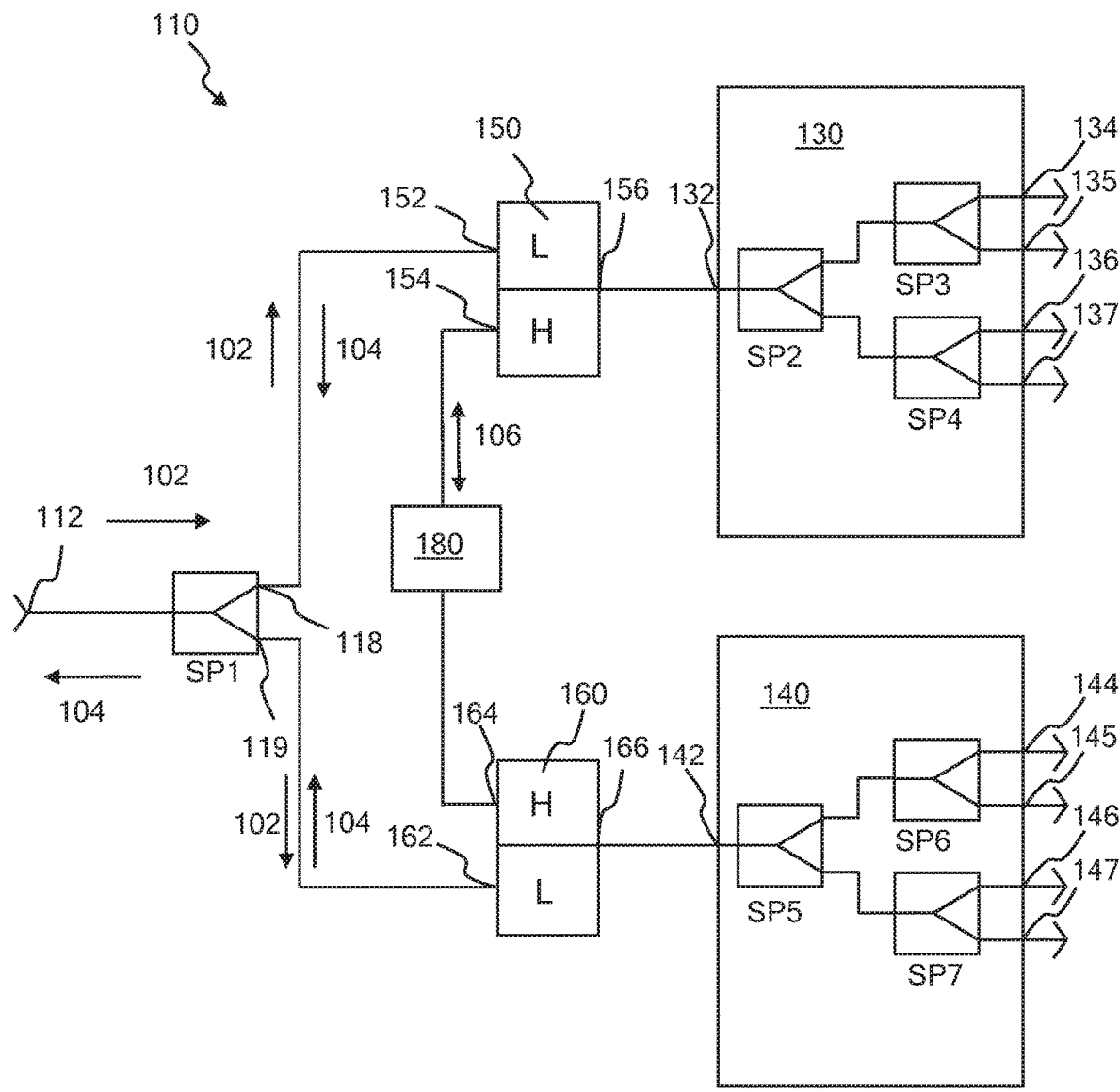
FIG. 4 is a schematic diagram of a further embodiment of CATV signal distribution system 110 according to the invention.

FIG. 4 shows a further embodiment of CATV signal distribution system 110 according to the invention. CATV signal distribution circuit 110 of FIG. 4 operates the same as CATV signal distribution system shown in FIG. 3, except that in the embodiment of CATV signal distribution system 110 shown in FIG. 4, first diplexer high-pass node 154 is coupled to second diplexer high-pass node 164 through attenuator circuit 180. Attenuator circuit 180 can be many different types of signal conditioning circuits. In this embodiment attenuator circuit 180 controls the attenuation of signals passing from first diplexer high-pass node 154 and second diplexer high-pass node 164. Attenuator circuit 180 in this embodiment allows the level of attenuation of multimedia-over-coax signals 106 passing between first four-way splitter 130 and second four-way splitter 140 to be adjusted to a particular desired level of attenuation. In some embodiments attenuator circuit 180 includes an equalizer circuit which allows equalization of multimedia signals 106 being conducted between first four-way signal splitter 130 and second four-way signal splitter 140. In some embodiments attenuator circuit 180 includes a reflectance circuit which controls signal reflection of multimedia signals 106 being conducted between first four-way signal splitter 130 and second four-way signal splitter 140. Attenuator circuit 180 can be have an adjustable amount of attenuation. In some embodiments attenuator circuit 180 has an amount of attenuation that is adjustable from 0 dB to a predetermined amount of attenuation.

In some embodiments attenuator circuit 180 can include an active circuit element such as an amplifier. Including an amplifier in circuit 180 allows multimedia-over-coax signals 106 to be amplified as well as attenuated.

Figure 5:
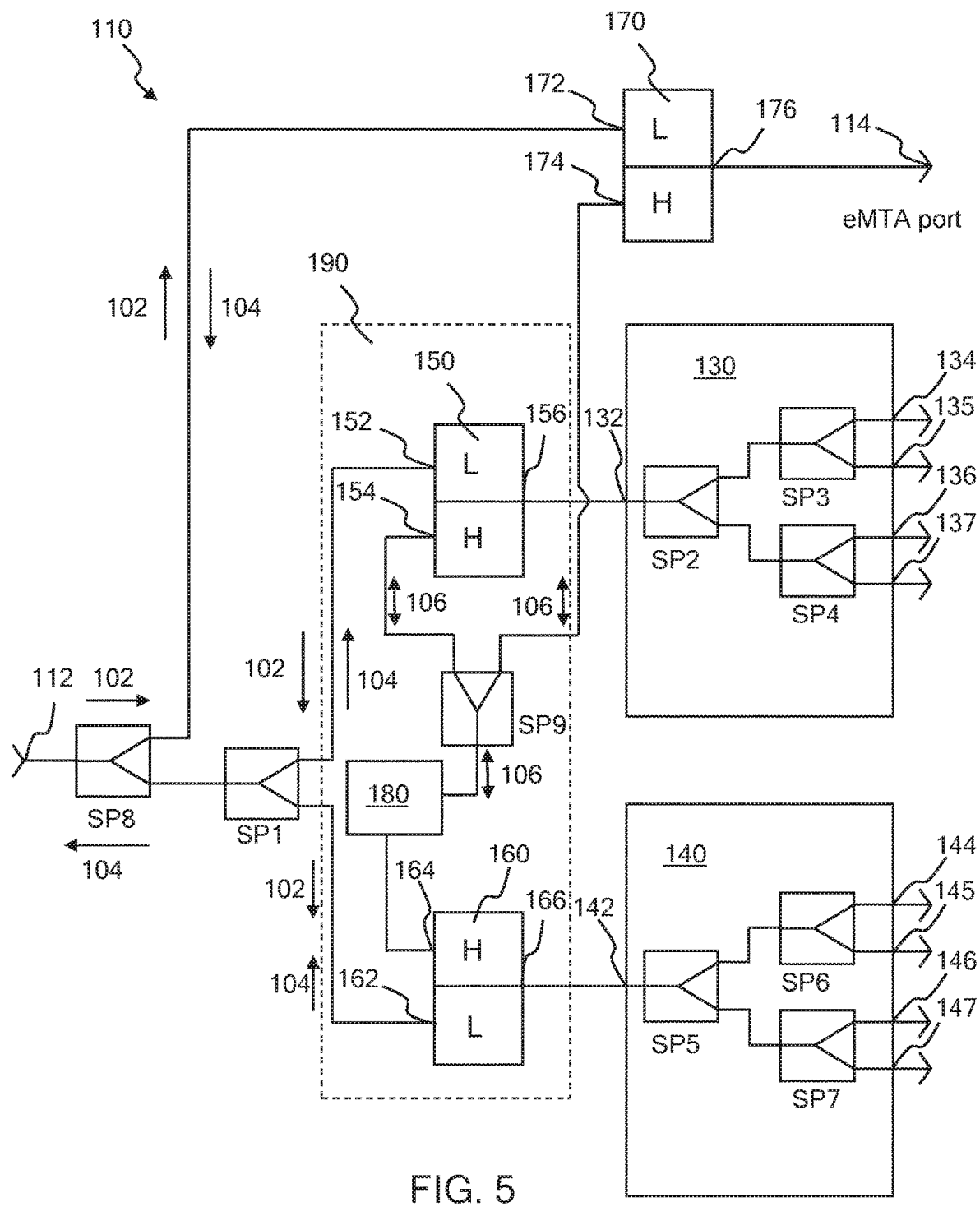
FIG. 5 is a schematic diagram of a further embodiment of CATV signal distribution system 110 according to the invention.
Figure 6:
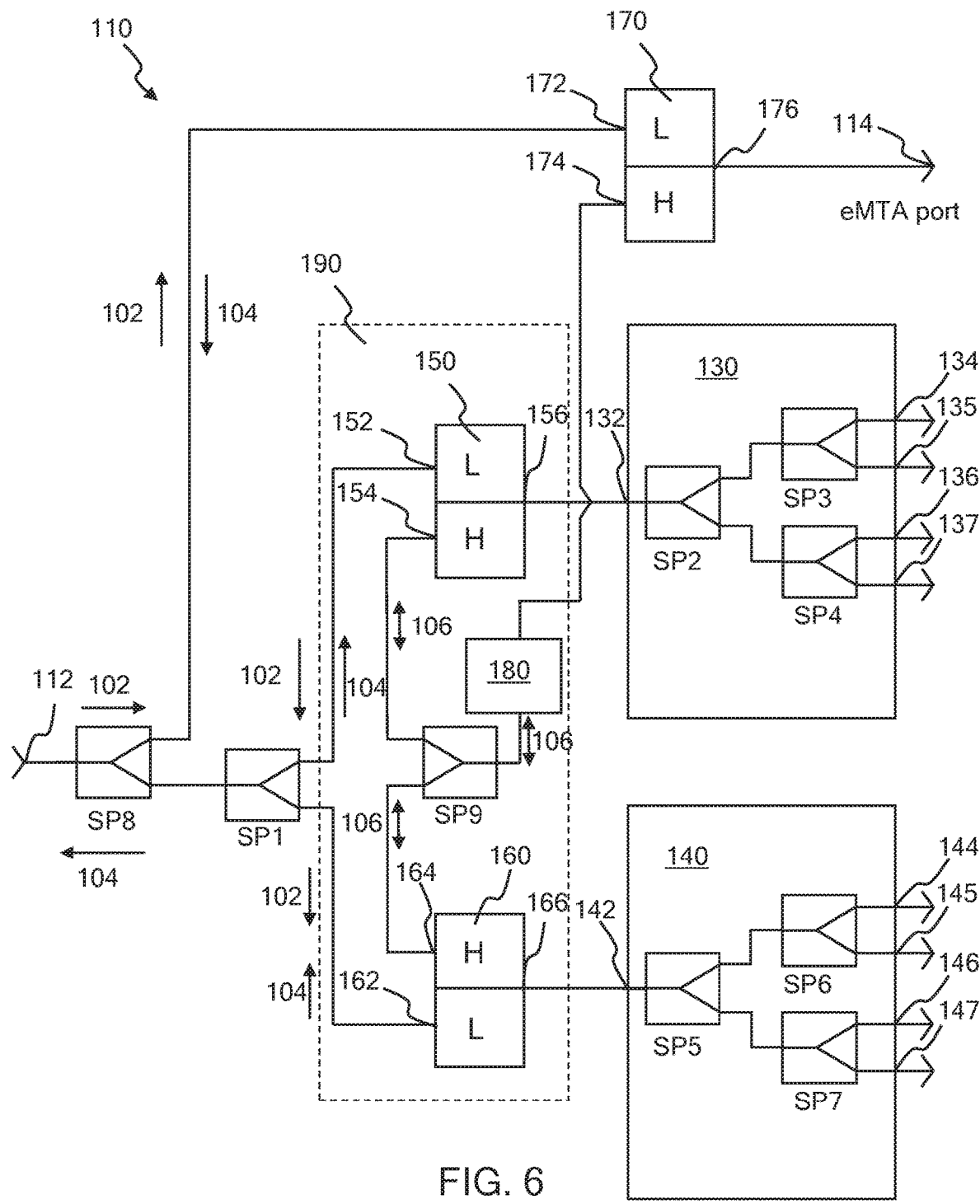
FIG. 6 is a schematic diagram of another embodiment of CATV signal distribution system 110 according to the invention.
Figure 7:
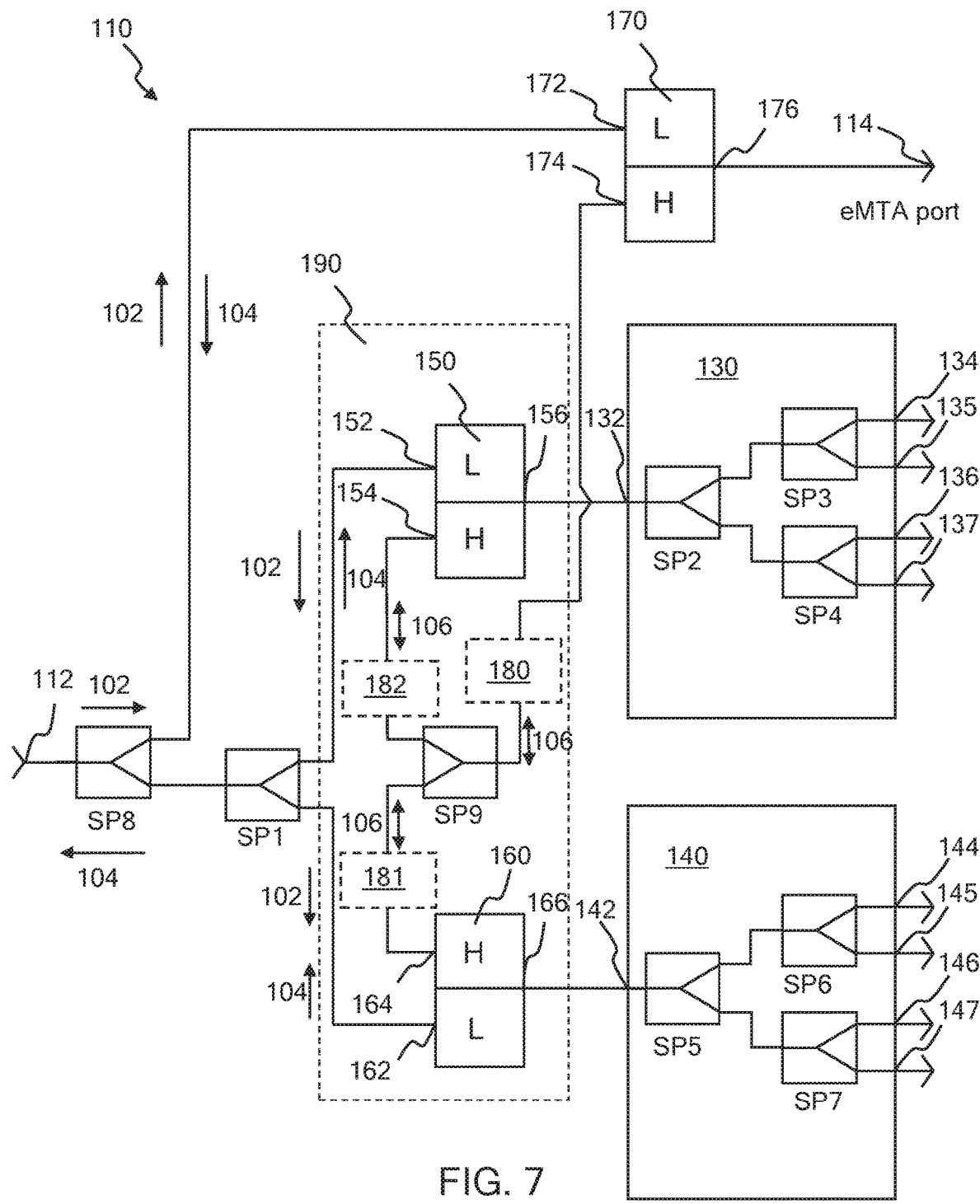
FIG. 7 is a schematic diagram of another embodiment of CATV signal distribution system 110 according to the invention.

FIG. 5, FIG. 6, and FIG. 7 each show embodiments of CATV signal distribution system 110 according to the invention for systems which include eMTA port 114. In the embodiments shown in FIG. 5, FIG. 6, and FIG. 7, CATV signal distribution system 110 includes signal input port 112, first multi-port signal splitter 130, second multi-port signal splitter 140, and signal output port 114, where output port 114 is meant to be coupled to a piece of eMTA equipment. First multi-port signal splitter 130 is coupled to signal input port 112 through first diplexer 150 as explained with reference to FIG. 1 and FIG. 2. Second multi-port signal splitter 140 is coupled to signal input port 112 through second diplexer 160 as explained with reference to FIG. 1 and FIG. 2. Signal output port 114 is coupled to signal input port 112 through third diplexer 170. In some embodiments CATV signal distribution system 110 includes more than two multi-port signal splitters. In the embodiment shown in FIG. 5, FIG. 6, and FIG. 7, multi-port signal splitter 130 is a four-way signal splitter, but the invention is not limited in this aspect. In the embodiment shown in FIG. 5, FIG. 6, and FIG. 7, multi-port signal splitter 140 is a four-way signal splitter, but the invention is not limited in this aspect. In some embodiments CATV signal distribution system 110 according to the invention includes two or more multi-port signal splitters, where each of the multi-port signal splitters has two or more multi-port signal splitter output ports.

In the embodiments shown in FIG. 5, FIG. 6, and FIG. 7, CATV signal distribution system 110 includes signal input port 112, first four-way signal splitter 130, second four-way signal splitter 140, and signal output port 114, where output port 114 is meant to be coupled to a piece of eMTA equipment. First four-way signal splitter 130 is coupled to signal input port 112 through first diplexer 150 as explained with reference to FIG. 1 and FIG. 2. Second four-way signal splitter 140 is coupled to signal input port 112 through second diplexer 160 as explained with reference to FIG. 1 and FIG. 2. Signal output port 114 is coupled to signal input port 112 through third diplexer 170. Third diplexer 170 is used to allow a piece of eMTA subscriber equipment such as subscriber equipment 116, that is IHE compatible, to communicate with IHE-compatible subscriber equipment 115 coupled to first and second four-way splitters 130 and 140. in the embodiments shown in FIG. 5, FIG. 6, and FIG. 7, signal input port 112 is coupled to first diplexer low-pass node 152 of first diplexer 150, second diplexer low-pass node 162 of second diplexer 160, and third diplexer low-pass node 172 of third diplexer 170. These connections allow downstream CATV signals 102 and upstream CATV signals 104 to be conducted from signal input port 112 to signal output ports 114, 134, 135, 136, 137, 144, 145, 146, and 147 through the low-frequency paths of first diplexer 150, second diplexer 160, and third diplexer 170.

Multimedia-over-coax signals 106 in the embodiments shown in FIG. 5, FIG. 6, and FIG. 7 are conducted between signal output ports 114, 134, 135, 136, 137, 144, 145, 146, and 147 through the high-pass nodes of first diplexer 150, second diplexer 160, and third diplexer 170, as explained further below.

In some embodiments CATV signal distribution system 110 as shown in FIG. 5, FIG. 6, and FIG. 7 is included in a CATV entry adapter. In some embodiments CATV signal distribution system 110 as shown in FIG. 5, FIG. 6, and FIG. 7 is distributed among several locations and enclosures within a home or business. In some embodiments first and second diplexers 150 and 160 and attenuator circuits 180, 181, and 182 are include in a single module—an adjustable isolation module 190 as shown in the figures. Adjustable isolation module 190 allows the isolation of multimedia-over-coax signals 106 to be adjusted. It is to be understood that the figures show examples of CATV signal distribution system 110 and adjustable isolation module 190, and that many other specific embodiments are possible with different components and interconnections.

In some embodiments CATV signal distribution system 110 of FIG. 5, FIG. 6, and FIG. 7 includes active circuit elements, such as one or more amplifier or other active network circuit elements. In some embodiments an active circuit element is placed between splitter SP8 and splitter SP1. In some embodiments an active circuit element is placed within adjustable isolation module 190. In some embodiments an amplifier is placed between splitter SP8 and splitter SP1. In some embodiments an amplifier is placed within adjustable isolation module 190. In some embodiments an active circuit element is placed between first diplexer common node 156 and first four-way splitter input node 132. In some embodiments an active circuit element is placed between second diplexer common node 166 and second four-way splitter input node 142. In some embodiments an active element is placed elsewhere in CATV signal distribution system 110 of FIG. 5, FIG. 6, or FIG. 7.

In the embodiment shown in FIG. 5, first and second diplexer high-pass nodes 154 and 164 are coupled together through attenuator circuit 180, and third diplexer high-pass node 174 is coupled to first diplexer high-pass node 154 through splitter SP9. In this embodiment first diplexer 150 includes first diplexer common node 156 coupled to first four-way signal splitter input port 132, first diplexer high-pass node 154 coupled to third diplexer high-pass node 174, and first diplexer low-pass node 152 coupled to signal input port 112. In this embodiment first diplexer high-pass node 154 is coupled to third diplexer high-pass node 174 through signal splitter SP9. In this embodiment first diplexer low-pass node 152 is coupled to signal input port 112 through signal splitters SP1 and SP8.

In the embodiment shown in FIG. 5, second diplexer 160 includes second diplexer common node 166 coupled to second four-way signal splitter input port 142, second diplexer high-pass node 164 coupled to first diplexer high-pass node 154 through attenuator circuit 180 and splitter SP9, and second diplexer low-pass node 162 coupled to signal input port 112. In this embodiment second diplexer low-pass node 162 is coupled to signal input port 112 through signal splitters SP1 and SP8. Attenuator circuit 180 allows adjustable attenuation of multimedia-over-coax signals 106 conducted between first diplexer high-pass node 154 and second diplexer high-pass node 164. In some embodiments attenuator circuit 180 includes an equalizer circuit. An equalizer circuit section of attenuator circuit 180 adjusts the frequency response tilt, when needed, in the multimedia-over-coax band. In some embodiments attenuator circuit 180 includes a reflectance circuit. A reflectance circuit section of attenuator circuit 180 is used to adjust the isolation level among output ports of the individual four-way splitters 130 and 140, and signal output port 114. In some embodiments attenuator circuit 180 can include an active circuit element such as an amplifier. Including an amplifier in circuit 180 allows multimedia-over-coax signals 106 to be amplified as well as attenuated.

In the embodiment shown in FIG. 5, multimedia-over-coax signals 106 are conducted between signal output ports 114, 134, 135, 136, 137, 144, 145, 146, and 147 using the high-frequency signal path that connects high-pass nodes 154, 164, and 174 of first, second, and third diplexers 150, 160, and 170. This minimizes isolation losses of multimedia-over-coax signals 106 being conducted between multimedia devices connected to signal output ports 114, 134, 135, 136, 137, 144, 145, 146, and 147, and allows adjustment of the frequency response and reflectance of the multimedia-over-coax signals 106. This also allows management of multimedia-over coax signals 106 without damaging or compromising the CATV network or CATV signals 102 or 104. In this embodiment the eMTA subscriber equipment coupled to signal output port 114 can communicate with IHE-compatible subscriber equipment 115 coupled to any of the output ports 134, 135, 136, 137, 144, 145, 146, or 147 of first four-way signal splitter 130 and second four-way signal splitter 140. This communication is difficult to impossible in the prior art system shown in FIG. 2 due to multimedia-over-coax signal 106 losses due to the signals jumping the legs of the signal splitters. Also, in the system shown in FIG. 5, IHE-compatible subscriber equipment 115 coupled to output ports 134, 135, 136, or 137 of first four-way signal splitter 130 can communicate using multimedia-over-coax signals 106 with any of the IHE-compatible subscriber equipment 115 coupled to output ports 144, 145, 146, or 147 of second four-way signal splitter 140. This communication is difficult to impossible in the prior art systems shown in FIG. 1 and FIG. 2 due to multimedia-over-coax signal 106 losses from signals 106 jumping the legs of the signal splitters.

In the embodiment shown in FIG. 6, first and second diplexer high-pass nodes 154 and 164 are coupled together, and third diplexer high-pass node 174 is coupled to first diplexer high-pass node 154 and second diplexer high-pass node 164 through attenuator circuit 180. In this embodiment first diplexer 150 includes first diplexer common node 156 coupled to first four-way signal splitter input port 132, first diplexer high-pass node 154 coupled to third diplexer high-pass node 174, and first diplexer low-pass node 152 coupled to signal input port 112. In this embodiment first diplexer high-pass node 154 is coupled to third diplexer high-pass node 174 through signal splitter SP9 and attenuator circuit 180. In this embodiment first diplexer low-pass node 152 is coupled to signal input port 112 through signal splitters SP1 and SP8. Attenuator circuit 180 allows adjustable attenuation of multimedia-over-coax signals 106 conducted between third diplexer high-pass node 174 and both first diplexer high-pass node 154 and second diplexer high-pass node 164. In some embodiments attenuator circuit 180 includes an equalizer circuit that allows adjustment and equalization of the frequency response of multimedia-over-coax signals 106 conducted between third diplexer high-pass node 174 and both first diplexer high-pass node 154 and second diplexer high-pass node 164. An equalizer circuit section of attenuator circuit 180 adjusts the frequency response tilt when needed in the multimedia-over-coax band. In some embodiments attenuator circuit 180 includes a reflectance circuit. A reflectance circuit section of attenuator circuit 180 is used to adjust the isolation level among output ports of the individual four-way splitters 130 and 140, and signal output port 114. In some embodiments attenuator circuit 180 can include an active circuit element such as an amplifier. Including an amplifier in circuit 180 allows multimedia-over-coax signals 106 to be amplified as well as attenuated.

In the embodiment shown in FIG. 6, second diplexer 160 includes second diplexer common node 166 coupled to second four-way signal splitter input port 142, second diplexer high-pass node 164 coupled to first diplexer high-pass node 154, and second diplexer low-pass node 162 coupled to signal input port 112. In this embodiment second diplexer low-pass node 162 is coupled to signal input port 112 through signal splitters SP1 and. SP8. In this embodiment second diplexer high-pass node 164 is coupled to first diplexer high-pass node 154 through splitter SP9.

In the embodiment shown in FIG. 6, multimedia-over-coax signals 106 are conducted between signal output ports 114, 134, 135, 136, 137, 144, 145, 146, and 147 using the high-frequency signal path that connects high-pass nodes 154, 164, and 174 of first, second, and third diplexers 150, 160, and 170. This minimizes isolation losses of multimedia-over-coax signals 106 being conducted between multimedia devices connected to signal output ports 114, 134, 135, 136, 137, 144, 145, 146, and 147, and allows adjustment of the frequency response and reflectance of multimedia-over-coax signals 106. This also allows management of multimedia-over coax signals 106 without damaging or compromising the CATV network or CATV signals 102 or 104. In this embodiment an eMTA subscriber device, such as eMTA device 116, coupled to signal output port 114 can communicate with IHE-compatible subscriber equipment 115 coupled to any of the output ports 134, 135, 136, 137, 144, 145, 146, or 147 of first four-way signal splitter 130 and second four-way signal splitter 140. This communication is difficult to impossible in the prior art system shown in FIG. 2 due to multimedia-over-coax signal 106 losses due to the signals jumping the legs of the signal splitters. Also, in the system shown in FIG. 6, IHE-compatible subscriber equipment 115 coupled to output ports 134, 135, 136, or 137 of first four-way signal splitter 130 can communicate using multimedia-over-coax signals 106 with any of the IHE-compatible subscriber equipment coupled to the output ports 144, 145, 146, or 147 of second four-way signal splitter 140. This communication is difficult to impossible in the prior art systems shown in FIG. 1 and FIG. 2 due to multimedia-over-coax signal 106 losses due to 106 signals jumping the legs of the signal splitters.

FIG. 7 shows a further embodiment of CATV signal distribution system 110 according to the invention. CATV signal distribution system 110 shown in FIG. 7 is similar to the CATV signal distribution systems 110 shown in FIG. 5 and FIG. 6, except CATV signal distribution system 110 shown in FIG. 7 includes several attenuator circuits, attenuator circuit 180, attenuator circuit 181, and attenuator circuit 182. Attenuator circuits 180, 181, and 182 are shown in dotted lines to indicate that each one of them is optional, and can be used in any combination with the other attenuator circuits. Attenuator circuits 180, 181, and 182 can be used in combination or individually to adjust and/or balance the attenuation between four-way splitter output ports 134, 135, 136, 137, 144, 145, 146, or 147, and signal output port 114 used with the eMTA device. Any of attenuator circuits 180, 182, or 182 can include an equalizer circuit. An equalizer circuit section of attenuator circuit 180, 181, or 182 adjusts the frequency response tilt, when needed, in the multimedia-over-coax band. Any of attenuator circuits 180, 181, or 182 can include a reflectance circuit. A reflectance circuit section of attenuator circuit 180, 181, or 182 is used to adjust the isolation level among output ports of the individual four-way splitters 130 and 140, and signal output port 114. Attenuator circuits 180, 181, or 182 can be fixed or adjustable attenuator circuits. Attenuator circuit 180, 181, or 182 can be designed to have an attenuation level that is adjustable from 0 dB to a required attenuation level. In some embodiments attenuator circuit 180, 181, or 182 can include an active circuit element such as an amplifier. Including an amplifier in circuit 180, 182, or 182 allows multimedia-over-coax signals 106 to be amplified as well as attenuated.

Figure 8:
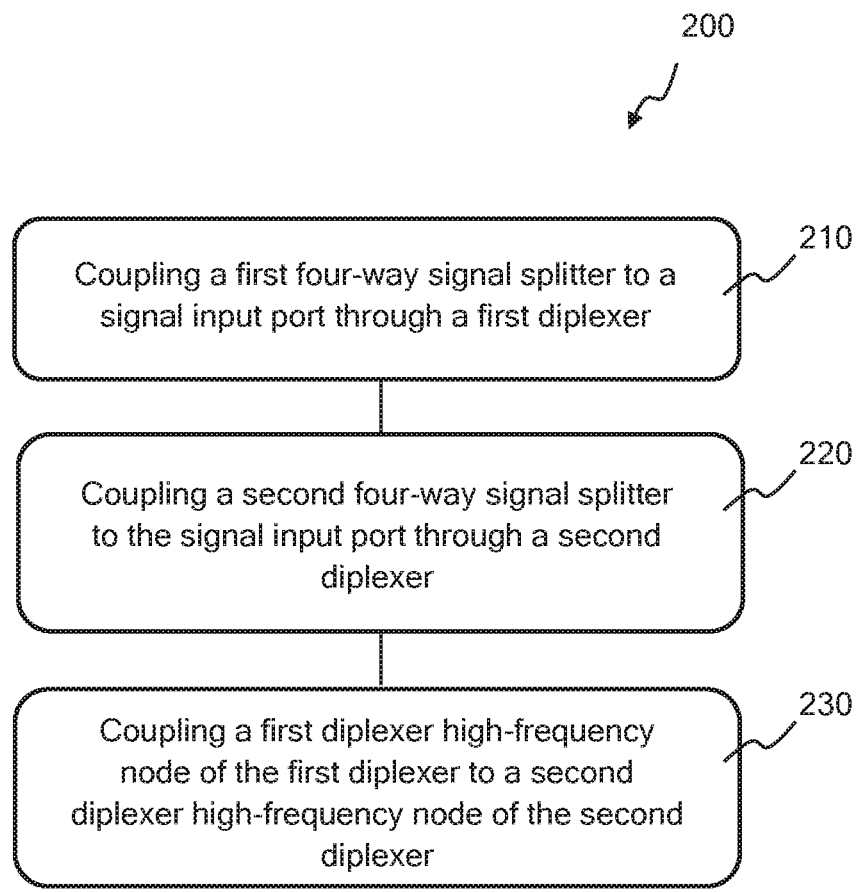
FIG. 8 illustrates method 200 of electrically coupling two four-way signal splitters according to the invention.

FIG. 8 shows method 200 of electrically coupling two four-way signal splitters according to the invention. Method 200 of electrically coupling two four-way signal splitters includes step 210 of coupling a first four-way signal splitter to a signal input port through a first diplexer, and step 220 of coupling a second four-way signal splitter to the signal input port through a second diplexer. Method 200 of electrically coupling two four-way signal splitters according to the invention also includes step 230 of coupling a first diplexer high-pass node of the first diplexer to a second diplexer high-pass node of the second diplexer. Method 200 can include many other steps. In some embodiments method 200 includes the step of coupling a signal output port to the signal input port through a third diplexer. In some embodiments a third diplexer common node is coupled to the signal output port, and a third diplexer low-pass node is coupled to the signal input port. In some embodiments method 200 includes the step of coupling a high-pass node of the third diplexer to the high-pass node of the first diplexer. In some embodiments method 200 includes the step of coupling a high-pass node of the third diplexer to the high-pass node of the first diplexer through an attenuator circuit. In some embodiments the attenuator circuit includes an equalizer circuit. In some embodiments the attenuator circuit includes a reflectance circuit.

Step 210 coupling a first four-way signal splitter to a signal input port through a first diplexer can include many other steps. In some embodiments step 210 includes the step of coupling a first diplexer common node to a first four-way signal splitter input port. In some embodiments step 210 includes the step of coupling a first diplexer low-pass node to the signal input port.

Step 220 coupling a second four-way signal splitter to the signal input port through a second diplexer can include many other steps. In some embodiments step 220 includes the step of coupling a second diplexer common node to a second four-way signal splitter input port. In some embodiments step 220 includes the step of coupling a second diplexer low-pass node to the signal input port.

Step 230 coupling a first diplexer high-pass node of the first diplexer to a second diplexer high-pass node of the second diplexer can include many other steps. In some embodiments step 230 includes the step of coupling the first diplexer high-pass node of the first diplexer to the second diplexer high-pass node of the second diplexer through an attenuator circuit. In some embodiments the attenuator circuit includes an equalizer circuit. In some embodiments the attenuator circuit includes a reflectance circuit.

A method of electrically coupling two multi-port signal splitters is disclosed. The method according to the invention includes the steps of coupling a first multi-port signal splitter to a signal input port through a first diplexer, coupling a second multi-port signal splitter to the signal input port through a second diplexer, and coupling a first diplexer high-pass node of the first diplexer to a second diplexer high-pass node of the second diplexer. In some embodiments coupling a first multi-port signal splitter to a signal input port through a first diplexer includes the steps of coupling a first diplexer common node to a first multi-port signal splitter input port, and coupling a first diplexer low-pass node to the signal input port. In some embodiments coupling a second multi-port signal splitter to a signal input port through a second diplexer includes the steps of coupling a second diplexer common node to a second multi-port signal splitter input port, and coupling a second diplexer low-pass node to the signal input port.

In some embodiments the step of coupling a first diplexer high-pass node of the first diplexer to a second diplexer high-pass node of the second diplexer includes coupling the first diplexer high-pass node of the first diplexer to the second diplexer high-pass node of the second diplexer through an attenuator circuit. In some embodiments the attenuator circuit includes an equalizer circuit. In some embodiments the method of electrically coupling two multi-port signal splitters according to the invention includes the step of coupling a signal output port to the signal input port through a third diplexer, where a third diplexer common node is coupled to the signal output port, and where a third diplexer low-pass node is coupled to the signal input port. In some embodiments the method includes the step of coupling a high-pass node of the third diplexer to the high-pass node of the first diplexer. In some embodiments the method includes the step of coupling a high-pass node of the third diplexer to the high-pass nodes of the first and the second diplexers.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

The invention claimed is:

1. A community access television (CATV) signal distribution system comprising:
 a CATV port configured to connect the CATV signal distribution system to a CATV network;
 a first plurality of device ports configured to connect the CATV signal distribution system to a first plurality of subscriber devices;
 a second plurality of device ports configured to connect the CATV signal distribution system to a second plurality of subscriber devices;
 a CATV signal splitter comprising a common terminal, a first output terminal, and a second output terminal, wherein:
  the common terminal of the CATV signal splitter is coupled to the CATV signal input port and configured to receive a CATV signal from the input port;
  the CATV signal splitter is configured to divide a CATV downstream signal received at the common terminal into multiple CATV downstream signals supplied to the first and second output terminals of the signal splitter, and
  the CATV signal splitter is configured to combine CATV upstream signals received at the first and second output terminals of the CATV signal splitter;
 a first device signal splitter comprising a first common terminal and a first plurality of output terminals, wherein the first plurality of output terminals of the first device signal splitter are coupled to the first plurality of device ports;
 a second device signal splitter comprising a second common terminal and a second plurality of output terminals, wherein the second plurality of output terminals of the second device signal splitter are coupled to the second plurality of device ports;
 a first diplexer comprising a common terminal, a high-pass terminal, and a low-pass terminal, the first diplexer configured to:
  communicate signals within a predetermined high frequency band between the common terminal of the first diplexer and the high-pass terminal of the first diplexer, and
  communicate signals within a predetermined low frequency band between the common terminal of the first diplexer and the low-pass terminal of the first diplexer,
  wherein the common terminal of the first diplexer is coupled to the common terminal of the first device signal splitter,
  wherein the low-pass terminal of the first diplexer is coupled to the common terminal of the CATV signal splitter, and
 a second diplexer comprising a common terminal, a high-pass terminal, and a low-pass terminal, the second diplexer configured to:
  communicate signals within the predetermined high frequency band between the common terminal of the second diplexer and the high-pass terminal of the second diplexer,
  communicate signals at the predetermined low frequency band between the common terminal of the second diplexer and the low-pass terminal of the second diplexer,
  wherein the common terminal of the second diplexer is coupled to the common terminal of the second device signal splitter,
  wherein the low-pass terminal of the second diplexer is coupled to the second output terminal of the CATV signal splitter, and
  wherein the high-pass terminal of the second diplexer is coupled to the high-pass terminal of the first diplexer; and
 an attenuator circuit configured to:
  bidirectionally communicate the signals within the predetermined high frequency band transmitted between the common terminal of the first diplexer and the common terminal of the second diplexer through the high-pass terminal of the first diplexer and the high-pass terminal of the second diplexer, and
  control a level of attenuation of the signals in the predetermined high frequency band bidirectionally communicated between from the high-pass terminal of the first diplexer to the high-pass terminal of the second diplexer.

2. The CATV signal distribution system of claim 1, wherein the attenuator circuit includes an equalizer circuit configured to equalize the signals within the predetermined high frequency band bidirectionally communicated between the first and second pluralities of subscriber devices.

3. The CATV signal distribution system of claim 1, wherein the attenuator circuit includes a reflectance circuit configured to control signal reflection of the signals within the predetermined high frequency band bidirectionally communicated between the first and second pluralities of subscriber devices.

4. The CATV signal distribution system of claim 1, wherein the level of attenuation in the attenuator circuit is adjustable.

5. The CATV signal distribution system of claim 1, wherein the attenuator circuit includes an active circuit element comprising an amplifier, the attenuator circuit configured to control attenuation and amplification of the signals within the predetermined high frequency band bidirectionally communicated between the first and second pluralities of subscriber devices.

6. A community access television (CATV) signal distribution system configured to conduct downstream and upstream CATV signals between a CATV network and at least one subscriber device at a subscriber premises, and further configured to conduct in-home entertainment signals between multiple subscriber devices at the subscriber premises connected in an in-home entertainment network, the CATV signals occupying a frequency band which is different from an in-home network frequency band occupied by the in-home entertainment signals, the CATV signal distribution system comprising:

a CATV signal input port configured for connection to the CATV network;

a signal splitter comprising a common terminal configured to be coupled to the CATV signal input port, and two output terminals, the signal splitter configured to divide a CATV downstream signal received at the common terminal into multiple CATV downstream signals supplied at its output terminals, the signal splitter also configured to communicate upstream signals received at each output terminal to the common terminal;

a first diplexer comprising a common node, a high-pass node, and a low-pass node, the first diplexer configured to communicate in-home entertainment signals within a predetermined high frequency band between the common node of the first diplexer and the high-pass node of the first diplexer, and further configured to communicate signals at a predetermined low frequency band between the common node and the low-pass node, the low-pass node configured to be coupled to one of the output terminals of the signal splitter, the common node configured to be coupled to at least a first in-home entertainment-compatible subscriber device;

a second diplexer comprising a common node, a high-pass node, and a low-pass node, the second diplexer configured to communicate the in-home entertainment signals within the predetermined high frequency band between the common node of the second diplexer and the high-pass node of the second diplexer, and further configured to communicate signals at the predetermined low frequency band between the common node and the low-pass node, the low-pass node configured to be coupled to the other of the output terminals of the signal splitter, the common node configured to be coupled to at least a second in-home entertainment-compatible subscriber device, wherein the splitter is directly connected to the first diplexer and the second diplexer;

an attenuator circuit configured to:
couple the high-pass node of the first diplexer to the high-pass node of the second diplexer, the attenuator circuit configured to bidirectionally conduct in-home entertainment signals within the predetermined high frequency band between the first and second in-home entertainment-compatible subscriber devices, and configured to control attenuation of in-home entertainment signals within the predetermined high frequency band bidirectionally conducted between the first and second in-home entertainment-compatible subscriber devices, control a level of attenuation of the in-home entertainment signals within the predetermined high frequency band between the first and second in-home entertainment-compatible subscriber devices passing from the high-pass terminal of the first diplexer to the high-pass terminal of the second diplexer and passing from the high-pass terminal of the second diplexer to the high-pass terminal of the first diplexer, and adjust a frequency response tilt of the in-home entertainment signals within the predetermined high frequency band bidirectionally communicated between the first plurality of in-home entertainment-compatible subscriber devices and the second plurality of in-home entertainment-compatible subscriber devices through the high-pass terminal of the first diplexer and the high-pass terminal of the second diplexer;

a first plurality of device ports configured to connect to a first plurality of in-home entertainment-compatible subscriber devices;

a second plurality of device ports configured to connect to a second plurality of in-home entertainment-compatible subscriber devices;

a first multi-port signal splitter comprising an input terminal and a plurality of output terminals, wherein:
the input terminal of the first multi-port splitter is coupled to the common node of the first diplexer,
the plurality of output terminals of the of the first multi-port splitter are connected to the first plurality of device ports and configured to communicate signals within the predetermined low frequency band and the in-home entertainment signals within the predetermined high frequency band with the first plurality of in-home entertainment-compatible subscriber devices; and a second multi-port signal splitter comprising an input terminal and a plurality of output terminals, wherein:
the input terminal of the second multi-port splitter is coupled to the common port of the second diplexer,
the plurality of output terminals of the of the second multi-port splitter are connected to the second plurality of device ports and configured to communicate signals within the predetermined low frequency band and the in-home entertainment signals within the predetermined high frequency band with the second plurality of in-home entertainment-compatible subscriber devices.

7. The CATV signal distribution system of claim 6, further comprising a first multi-port splitter having a common port and a plurality of output ports, the common port configured to be coupled to the common node of the first diplexer, and at least one of the output ports of the first multi-port configured to be coupled to the first in-home entertainment-compatible subscriber device.

8. The CATV signal distribution system of claim 7, wherein the first multi-port splitter comprises at least four output ports.

9. The CATV signal distribution system of claim 8, wherein the first multi-port splitter comprises three two-way splitters.

10. The CATV signal distribution system of claim 7, further comprising a second multi-port splitter having a common port and a plurality of output ports, the common port of the second multi-port splitter being configured to be coupled to the common node of the second diplexer, and at least one of the output ports of the second multi-port splitter configured to be coupled to the second in-home entertainment-compatible subscriber device.

11. The CATV signal distribution system of claim 10, wherein the second multi-port splitter comprises at least four output ports.

12. The CATV signal distribution system of claim 6, wherein the attenuator circuit includes an equalizer circuit configured to equalize the in-home entertainment signals conducted between the first and second in-home entertainment-compatible subscriber devices.

13. The CATV signal distribution system of claim 6, wherein the attenuator circuit includes a reflectance circuit configured to control signal reflection of the in-home entertainment signals conducted between the first and second in-home entertainment-compatible subscriber devices.

14. The CATV signal distribution system of claim 6, wherein the attenuated circuit is configured to adjust a level of attenuation.

15. The CATV signal distribution system of claim 14, wherein the level of attenuation is adjustable from 0 dB to a predetermined level of attenuation.

16. The CATV signal distribution system of claim 6, wherein the high-pass node of the first diplexer is configured to couple to the high-pass node of the second diplexer via the attenuator without any splitting of the in-home entertainment signals conducted between the first and second in-home entertainment-compatible subscriber devices.

17. The CATV signal distribution system of claim 6, wherein the attenuator circuit is not unidirectional.

18. The CATV signal distribution system of claim 6, wherein the attenuator circuit is configured to control a level of attenuation of the in-home entertainment signals between the first and second in-home entertainment-compatible subscriber devices passing from the high-pass node of the first diplexer to the high-pass node of the second diplexer and passing from the high-pass node of the second diplexer to the high-pass node of the first diplexer.

19. The CATV signal distribution system of claim 18, wherein the attenuator circuit is configured to adjust an amount of attenuation from 0 decibels to a predetermined amount of attenuation.

20. The CATV signal distribution system of claim 6, wherein the attenuator comprises an equalizer circuit section configured to adjust a frequency response tilt in a frequency band of the in-home entertainment signals conducted between the first and second in-home entertainment-compatible subscriber devices.

21. The CATV signal distribution system of claim 20, wherein the attenuator is configured to adjust isolation among the first and second in-home entertainment-compatible subscriber devices.

22. A community access television (CATV) signal distribution system comprising:
a CATV signal input port connected to a CATV network;
a signal splitter comprising a common terminal coupled to the CATV signal input port, and two output terminals, the signal splitter configured to:
divide a CATV downstream signal received at the common terminal into multiple CATV downstream signals supplied at the two output terminals, and
communicate upstream signals received at each output terminal to the common terminal;
a first diplexer comprising a common node, a high-pass node, and a low-pass node, the first diplexer configured to:
communicate signals within a predetermined high frequency band between the common node and the high-pass node, wherein the predetermined high frequency band is 900 mega-Hertz or greater, and
communicate signals at a predetermined low frequency band between the common node and the low-pass node,
wherein the low-pass node is coupled to one of the output terminals of the signal splitter, and
wherein the common node is coupled to at least a first in-home entertainment-compatible subscriber device;
a second diplexer comprising a common node, a high-pass node, and a low-pass node, the second diplexer configured to:
communicate signals within the predetermined high frequency band between the common node and the high-pass node, and further configured to communicate signals at the predetermined low frequency band between the common node and the low-pass node, the low-pass node configured to be coupled to the other of the output terminals of the signal splitter, the common node configured to be coupled to at least a second in-home entertainment-compatible subscriber device;
an attenuator circuit configured to bidirectionally communicate the signals within the predetermined high frequency band transmitted between the common node of the first diplexer and the common node of the second diplexer via the high-pass node of the first diplexer to the high-pass node of the second diplexer without signal attenuation due to splitting the signals within the predetermined high frequency band, wherein the attenuator circuit is configured to:
control a level of attenuation of the signals within the predetermined high frequency band communicated between the first and second in-home entertainment-compatible subscriber devices passing from the high-pass node of the first diplexer to the high-pass node of the second diplexer and passing from the high-pass node of the second diplexer to the high-pass node of the first diplexer, and
adjust a frequency response tilt in a frequency band within the signals of the predetermined high frequency band communicated between the first plurality of in-home entertainment-compatible subscriber devices and the first plurality of in-home entertainment-compatible subscriber devices passing from the high-pass node of the first diplexer to the high-pass node of the second diplexer and passing from the high-pass node of the second diplexer to the high-pass node of the first diplexer;

a first plurality of device ports configured to connect to a first plurality of in-home entertainment-compatible subscriber devices;
a second plurality of device ports configured to connect to a second plurality of in-home entertainment-compatible subscriber devices;
a first multi-port signal splitter comprising an input terminal and a plurality of output terminals, wherein:
the input terminal of the first multi-port splitter is coupled to the common port of the first diplexer,
the plurality of output terminals of the of the first multi-port splitter are connected to the first plurality of device ports and configured to bidirectionally communicate signals at the predetermined low frequency band and signals at the predetermined high frequency band with the first plurality of in-home entertainment-compatible subscriber devices; and
a second multi-port signal splitter comprising an input terminal and a plurality of output terminals, wherein:
the input node of the second multi-port splitter is coupled to the common port of the second diplexer,
the plurality of output terminals of the of the second multi-port splitter are connected to the second plurality of device ports and configured to bidirectionally communicate signals at the predetermined low frequency band and signals at the predetermined high frequency band with the second plurality of in-home entertainment-compatible subscriber devices.

23. A community access television (CATV) signal distribution system comprising:
a CATV signal input port configured for connection to a CATV network;
a signal splitter comprising a common splitter terminal and at least two splitter output terminals, wherein:
the common splitter terminal couples to the CATV signal input port,
the signal splitter is configured to divide a CATV downstream signal received at the common terminal into multiple CATV downstream signals supplied at the at least two splitter output terminals,
the signal splitter is configured to communicate upstream signals received at the at least two splitter output terminals to the common splitter terminal;
a first diplexer comprising a first common node, a first high-pass node, and a first low-pass node, wherein:
the first diplexer is configured to communicate signals within a predetermined high frequency band between the first common node of the first diplexer and the first high-pass node of the first diplexer,
the first diplexer is configured to communicate signals at a predetermined low frequency band between the first common node and the first low-pass node,
the first low-pass node directly connects to a first splitter output terminal of the at least two splitter output terminals, and
the first common node is configured to be coupled to at least a subscriber device;
a second diplexer comprising a second common node, a second high-pass node, and a second low-pass node, wherein:
the second diplexer is configured to communicate signals within the predetermined high frequency band between the second common node of the second diplexer and the second high-pass node of the second diplexer,
the second diplexer is configured to communicate signals at the predetermined low frequency band between the second common node of the second diplexer and the second low-pass node of the second diplexer,
the second low-pass node of the second diplexer directly connects to a second splitter output terminal of the at least two splitter output terminals,
the common node of the second diplexer is configured to be coupled to at least a second in-home entertainment-compatible subscriber device, and
the second high-pass node of the second diplexer is configured to couple to the first high-pass node of the first diplexer, and
an attenuator circuit configured to:
condition the signals within the predetermined high frequency band, wherein the second high-pass node of the second diplexer and the first high-pass node of the first diplexer are configured to bidirectionally communicate the signals within the predetermined high frequency band among a plurality of subscriber devices via the attenuator circuit,
couple the high-pass node of the first diplexer to the high-pass node of the second diplexer, the attenuator circuit configured to bidirectionally conduct in-home entertainment signals within the predetermined high frequency band between the first and second in-home entertainment-compatible subscriber devices, and configured to control attenuation of in-home entertainment signals within the predetermined high frequency band bidirectionally conducted between the first and second in-home entertainment-compatible subscriber devices,
control a level of attenuation of the in-home entertainment signals within the predetermined high frequency band between the first and second in-home entertainment-compatible subscriber devices passing from the high-pass terminal of the first diplexer to the high-pass terminal of the second diplexer and passing from the high-pass terminal of the second diplexer to the high-pass terminal of the first diplexer, and
adjust a frequency response tilt of the in-home entertainment signals within the predetermined high frequency band bidirectionally communicated between the first plurality of in-home entertainment-compatible subscriber devices and the second plurality of in-home entertainment-compatible subscriber devices through the high-pass terminal of the first diplexer and the high-pass terminal of the second diplexer;
a first plurality of device ports configured to connect to a first plurality of in-home entertainment-compatible subscriber devices;
a second plurality of device ports configured to connect to a second plurality of in-home entertainment-compatible subscriber devices;
a first multi-port signal splitter comprising an input terminal and a plurality of output terminals, wherein:
the input terminal of the first multi-port splitter is coupled to the common node of the first diplexer,
the plurality of output terminals of the of the first multi-port splitter are connected to the first plurality of device ports and configured to communicate signals within the predetermined low frequency band and the in-home entertainment signals within the predetermined high frequency band with the first plurality of in-home entertainment-compatible subscriber devices; and a second multi-port signal splitter comprising an input terminal and a plurality of output terminals, wherein:
the input terminal of the second multi-port splitter is coupled to the common port of the second diplexer,
the plurality of output terminals of the of the second multi-port splitter are connected to the second plurality of device ports and configured to communicate signals within the predetermined low frequency band and the in-home entertainment signals within the predetermined high frequency band with the second plurality of in-home entertainment-compatible subscriber devices.

24. A community access television (CATV) signal distribution system configured to conduct downstream and upstream CATV signals between a CATV network and at least one subscriber device at a subscriber premises, and further configured to conduct in-home entertainment signals between multiple subscriber devices at the subscriber premises connected in an in-home entertainment network, the CATV signals occupying a frequency band which is different from an in-home network frequency band occupied by the in-home entertainment signals, the CATV signal distribution system comprising:
a CATV signal input port configured for connection to the CATV network;
a signal splitter comprising a common terminal configured to be coupled to the CATV signal input port, and two output terminals, the signal splitter configured to divide a CATV downstream signal received at the common terminal into multiple CATV downstream signals supplied at its output terminals, the signal splitter also configured to communicate upstream signals received at each output terminal to the common terminal;
a first diplexer comprising a common node, a high-pass node, and a low-pass node, the first diplexer configured to communicate in-home entertainment signals within a predetermined high frequency band between the common node of the first diplexer and the high-pass node of the first diplexer, and further configured to communicate signals at a predetermined low frequency band between the common node and the low-pass node, the low-pass node configured to be coupled to one of the output terminals of the signal splitter, the common node configured to be coupled to at least a first in-home entertainment-compatible subscriber device;
a second diplexer comprising a common node, a high-pass node, and a low-pass node, the second diplexer configured to communicate the in-home entertainment signals within the predetermined high frequency band between the common node of the second diplexer and the high-pass node of the second diplexer, and further configured to communicate signals at the predetermined low frequency band between the common node and the low-pass node, the low-pass node configured to be coupled to the other of the output terminals of the signal splitter, the common node configured to be coupled to at least a second in-home entertainment-compatible subscriber device;
an attenuator circuit configured to:
couple the high-pass node of the first diplexer to the high-pass node of the second diplexer, the attenuator circuit configured to bidirectionally conduct in-home entertainment signals within the predetermined high frequency band between the first and second in-home entertainment-compatible subscriber devices, and configured to control attenuation of in-home entertainment signals within the predetermined high frequency band bidirectionally conducted between the first and second in-home entertainment-compatible subscriber devices,
control a level of attenuation of the in-home entertainment signals within the predetermined high frequency band between the first and second in-home entertainment-compatible subscriber devices passing from the high-pass terminal of the first diplexer to the high-pass terminal of the second diplexer and passing from the high-pass terminal of the second diplexer to the high-pass terminal of the first diplexer, and
adjust a frequency response tilt of the in-home entertainment signals within the predetermined high frequency band bidirectionally communicated between the first plurality of in-home entertainment-compatible subscriber devices and the second plurality of in-home entertainment-compatible subscriber devices through the high-pass terminal of the first diplexer and the high-pass terminal of the second diplexer;
a first plurality of device ports configured to connect to a first plurality of in-home entertainment-compatible subscriber devices;
a second plurality of device ports configured to connect to a second plurality of in-home entertainment-compatible subscriber devices;
a first multi-port signal splitter comprising an input terminal and a plurality of output terminals, wherein:
the input terminal of the first multi-port splitter is coupled to the common node of the first diplexer,
the plurality of output terminals of the of the first multi-port splitter are connected to the first plurality of device ports and configured to communicate signals within the predetermined low frequency band and the in-home entertainment signals within the predetermined high frequency band with the first plurality of in-home entertainment-compatible subscriber devices; and
a second multi-port signal splitter comprising an input terminal and a plurality of output terminals, wherein:
the input terminal of the second multi-port splitter is coupled to the common port of the second diplexer,
the plurality of output terminals of the of the second multi-port splitter are connected to the second plurality of device ports and configured to communicate signals within the predetermined low frequency band and the in-home entertainment signals within the predetermined high frequency band with the second plurality of in-home entertainment-compatible subscriber devices.

25. A community access television (CATV) signal distribution system configured to conduct downstream and upstream CATV signals between a CATV network and at least one subscriber device at a subscriber premises, and further configured to conduct in-home entertainment signals between multiple subscriber devices at the subscriber premises connected in an in-home entertainment network, the CATV signals occupying a frequency band which is different from an in-home network frequency band occupied by the in-home entertainment signals, the CATV signal distribution system comprising:
a CATV signal input port configured for connection to the CATV network;

a signal splitter comprising a common terminal configured to be coupled to the CATV signal input port, and two output terminals, the signal splitter configured to divide a CATV downstream signal received at the common terminal into multiple CATV downstream signals supplied at its output terminals, the signal splitter also configured to communicate upstream signals received at each output terminal to the common terminal;

a first diplexer comprising a common node, a high-pass node, and a low-pass node, the first diplexer configured to communicate in-home entertainment signals within a predetermined high frequency band, wherein the predetermined high frequency band is 900 mega-Hertz or greater between the common node of the first diplexer and the high-pass node of the first diplexer, and further configured to communicate signals at a predetermined low frequency band between the common node and the low-pass node, the low-pass node configured to be coupled to one of the output terminals of the signal splitter, the common node configured to be coupled to at least a first in-home entertainment-compatible subscriber device;

a second diplexer comprising a common node, a high-pass node, and a low-pass node, the second diplexer configured to communicate the in-home entertainment signals within the predetermined high frequency band between the common node of the second diplexer and the high-pass node of the second diplexer, and further configured to communicate signals at the predetermined low frequency band between the common node and the low-pass node, the low-pass node configured to be coupled to the other of the output terminals of the signal splitter, the common node configured to be coupled to at least a second in-home entertainment-compatible subscriber device; and an attenuator circuit configured to:
couple the high-pass node of the first diplexer to the high-pass node of the second diplexer, the attenuator circuit configured to bidirectionally conduct in-home entertainment signals within the predetermined high frequency band between the first and second in-home entertainment-compatible subscriber devices, and configured to control attenuation of in-home entertainment signals within the predetermined high frequency band bidirectionally conducted between the first and second in-home entertainment-compatible subscriber devices, control a level of attenuation of the in-home entertainment signals within the predetermined high frequency band between the first and second in-home entertainment-compatible subscriber devices passing from the high-pass terminal of the first diplexer to the high-pass terminal of the second diplexer and passing from the high-pass terminal of the second diplexer to the high-pass terminal of the first diplexer, and adjust a frequency response tilt of the in-home entertainment signals within the predetermined high frequency band bidirectionally communicated between the first plurality of in-home entertainment-compatible subscriber devices and the second plurality of in-home entertainment-compatible subscriber devices through the high-pass terminal of the first diplexer and the high-pass terminal of the second diplexer;

a first plurality of device ports configured to connect to a first plurality of in-home entertainment-compatible subscriber devices;

a second plurality of device ports configured to connect to a second plurality of in-home entertainment-compatible subscriber devices;

a first multi-port signal splitter comprising an input terminal and a plurality of output terminals, wherein:
the input terminal of the first multi-port splitter is coupled to the common node of the first diplexer,
the plurality of output terminals of the of the first multi-port splitter are connected to the first plurality of device ports and configured to communicate signals within the predetermined low frequency band and the in-home entertainment signals within the predetermined high frequency band with the first plurality of in-home entertainment-compatible subscriber devices; and a second multi-port signal splitter comprising an input terminal and a plurality of output terminals, wherein:
the input terminal of the second multi-port splitter is coupled to the common port of the second diplexer,
the plurality of output terminals of the of the second multi-port splitter are connected to the second plurality of device ports and configured to communicate signals within the predetermined low frequency band and the in-home entertainment signals within the predetermined high frequency band with the second plurality of in-home entertainment-compatible subscriber devices.

* * * * *